(12) United States Patent
Osawa et al.

(10) Patent No.: US 12,117,460 B2
(45) Date of Patent: Oct. 15, 2024

(54) TEMPERATURE ADJUSTMENT SYSTEM AND TEMPERATURE ADJUSTMENT METHOD

(71) Applicant: OTSUKA PHARMACEUTICAL CO., LTD., Tokyo (JP)

(72) Inventors: Kou Osawa, Tokyo (JP); Takanori Murayama, Tokyo (JP); Yuuya Shouji, Tokyo (JP); Youichi Aoki, Saitama (JP); Hiroshi Hirayama, Tokyo (JP)

(73) Assignee: OTSUKA PHARMACEUTICAL CO., LTD., Tokyo (JP)

( * ) Notice: Subject to any disclaimer, the term of this patent is extended or adjusted under 35 U.S.C. 154(b) by 1030 days.

(21) Appl. No.: 17/045,109

(22) PCT Filed: Mar. 29, 2019

(86) PCT No.: PCT/JP2019/014052
§ 371 (c)(1),
(2) Date: Oct. 2, 2020

(87) PCT Pub. No.: WO2019/194096
PCT Pub. Date: Oct. 10, 2019

(65) Prior Publication Data
US 2021/0025908 A1    Jan. 28, 2021

(30) Foreign Application Priority Data

Apr. 5, 2018   (JP) .................................. 2018-073390

(51) Int. Cl.
| | |
|---|---|
| *G01N 35/04* | (2006.01) |
| *B01L 3/02* | (2006.01) |
| *G01N 35/00* | (2006.01) |

(52) U.S. Cl.
CPC .............. *G01N 35/04* (2013.01); *B01L 3/021* (2013.01); *G01N 2035/00425* (2013.01); *G01N 2035/0434* (2013.01)

(58) Field of Classification Search
CPC ...... G01N 35/025; G01N 35/04; G01N 35/10; G01N 35/00; G01N 21/648;
(Continued)

(56) References Cited

U.S. PATENT DOCUMENTS 5,287,758 A * 2/1994 Geiss ........................ B01L 7/00
422/922
6,576,477 B1 * 6/2003 Tokiwa ................... B01L 3/021
422/62
(Continued)

FOREIGN PATENT DOCUMENTS

| EP | 3376231 | 9/2018 |
| EP | 3594689 | 1/2020 |

(Continued)

OTHER PUBLICATIONS

Search Report dated Apr. 9, 2021, issued in European Patent Application No. EP 19 78 1492.4.
(Continued)

*Primary Examiner* — Shogo Sasaki
(74) *Attorney, Agent, or Firm* — Sughrue Mion, PLLC

(57) ABSTRACT

Temperature adjustment with a pipette tip temperature adjustment unit (7) and a drive unit (54) for raising and lowering a pipette tip (51), an environment temperature sensor (10) for sensing temperature inside an analysis apparatus (1A), a pump (53) for drawing a liquid into pipette tip (51) and discharging liquid in the pipette tip (51), and a control unit (6a) for setting, in advance, temperature control target value during sample analysis for unit (7) based on environment temperature sensed by sensor (10), and during (Continued)

sample analysis, drive unit (54) lowers pipette tip (51), pump (53) performs pumping wherein intake and discharge are repeated in a state in which unit (7) blows air, and unit (6a) sets, in advance, the temperature value for use during sample analysis for the pipette tip temperature adjustment unit (7) on the basis of analysis reagent information and the environment temperature sensed by e sensor (10).

12 Claims, 10 Drawing Sheets

(58) Field of Classification Search
CPC ... G01N 2035/0434; G01N 2035/1048; G01N 2035/00346; G01N 2035/00425; G01N 2035/00386; B01L 3/021
See application file for complete search history.

(56) References Cited

U.S. PATENT DOCUMENTS

| | | | |
|---|---|---|---|
| 7,438,861 B2 * | 10/2008 | Hochstrasser | G01N 35/10 422/547 |
| 7,850,921 B2 * | 12/2010 | Iguchi | G05D 23/24 422/63 |
| 9,821,305 B2 * | 11/2017 | Michels | B01L 3/021 |
| 10,466,263 B2 * | 11/2019 | Verhalen | G01N 35/0099 |
| 10,562,021 B2 * | 2/2020 | Nowak | B01L 3/0293 |
| 2004/0023404 A1 | 2/2004 | Shibata | |
| 2007/0148780 A1 | 6/2007 | Murata | |
| 2007/0274870 A1 * | 11/2007 | Hochstrasser | B01L 3/021 422/547 |
| 2008/0044311 A1 | 2/2008 | Iguci et al. | |
| 2010/0163111 A1 * | 7/2010 | Tajima | B01L 7/52 137/339 |
| 2011/0151482 A1 | 6/2011 | Emery et al. | |
| 2013/0195718 A1 | 8/2013 | Michels et al. | |
| 2014/0296089 A1 | 10/2014 | Holmes et al. | |
| 2017/0045544 A1 | 2/2017 | Verhalen | |
| 2018/0074043 A1 | 3/2018 | Makino et al. | |

FOREIGN PATENT DOCUMENTS

| | | |
|---|---|---|
| JP | 07-209306 | 8/1995 |
| JP | 10-094535 | 4/1998 |
| JP | 2004-37161 | 2/2004 |
| JP | 2008-14637 | 1/2008 |
| JP | 2008-70355 | 3/2008 |
| JP | 2009-058288 | 3/2009 |
| JP | 4437215 | 1/2010 |
| JP | 2010-197235 | 9/2010 |
| JP | 2010-286243 | 12/2010 |
| JP | 2012-159392 | 8/2012 |
| JP | 2014-092427 | 5/2014 |
| JP | 2015-148500 | 8/2015 |
| JP | 6187700 | 4/2017 |
| JP | 2017-83469 | 5/2017 |
| WO | WO 2017/082142 | 5/2017 |
| WO | WO 2019/123746 | 6/2019 |

OTHER PUBLICATIONS

International Preliminary Report on Patentability with Written Opinion dated Oct. 15, 2020 issued in International Patent Application No. PCT/JP2019/014052.

Kinshi Itoh et al., "toraburu wo sakeru tame no denshi kiki no netsu taisaku (thermal design of electronic devices to avoid possible problems)", 2nd ed. vol. 7, Nikkan Kogyo Shimbun, Ltd. (2016).

International Search Report issued in corresponding International Appln. No. WO 2019/194096.

* cited by examiner

TEMPERATURE ADJUSTMENT SYSTEM AND TEMPERATURE ADJUSTMENT METHOD

RELATED APPLICATIONS

This is a U.S. National Phase Application under 35 USC 371 of International Application PCT/JP2019/014052 filed on Mar. 29, 2019.

This application claims the priority of Japanese application no. 2018-073390 filed Apr. 5, 2018, the entire content of which is hereby incorporated by reference.

FIELD OF THE INVENTION

The present invention relates to a temperature adjustment system and a temperature adjustment method to be applied to an analysis apparatus that performs an analysis process on a sample such as a reagent by using a pipette tip and a reaction container.

BACKGROUND OF THE INVENTION

It is conventionally known that biochemical reactions and immune reactions are greatly affected by temperature. For example, in a fully automatic biochemical reaction apparatus or immune reaction apparatus using a sensor chip, a reagent such as a reaction liquid or a cleaning liquid is sequentially introduced into the sensor chip in the apparatus, and thus the temperature in the sensor chip is greatly affected by the temperature of the reagent to be introduced.

Here, it is known that the temperature in the sensor chip (reaction field) is greatly affected by the temperature of the reagent used, and it is known that the reagent temperature needs to be controlled.

Various cases are assumed for the reagent temperature, such as a case where the reagent temperature is adapted to the temperature of the surroundings, that is, the temperature of the measurement environment (hereinafter referred to as ambient temperature), and a case where the reagent temperature is the storage temperature since the reagent has just been taken out of a storage chamber (refrigerator). Accordingly, the temperature of the liquid to be used for each measurement can differ, which affects system performance such as repeatability of measurement.

Known techniques for addressing the problem described above include a method for controlling the reaction temperature by using a heat block, as described in Japanese Patent No. 4437215, and a temperature adjustment system including a mechanism for calculating a cooling time in accordance with a temperature sensor that senses the room temperature, as described in Japanese Patent No. 6187700. There is also known an automatic dispensing method capable of performing a heating treatment on liquids in pipette tips through gas and the pipette tips heated within a box-shaped heating apparatus, as described in Japanese Patent Application No. 2009-058288.

SUMMARY OF INVENTION

Technical Problem

Japanese Patent No. 4437215 discloses a method for setting the temperature of the heat block on the basis of the temperature of the surroundings of a container immediately before the start of temperature rise. Since a heat block having a large heat capacity is to be heated, it is difficult to sufficiently heat the heat block to a desired temperature within a reaction time. Another problem is that if heating is attempted to be complete within a time period, the amount of heat to be applied increases, resulting in deterioration of control stability.

The automatic dispensing method described in Japanese Patent No. 6187700 has a problem in that the pipette tip cannot be controlled to a reaction temperature suitable for the type of reagent, resulting in variation of reactivity. Specifically, there is a problem in that while the cooling time is calculated in accordance with an environmental temperature measured by the temperature sensor that senses the room temperature, the control temperature is not switched in accordance with the type of reagent, and thus the reactivity is different when the environmental temperature of the surroundings changes.

The automatic dispensing method described in Japanese Patent Application No. 2009-058288 has a problem in that while it is possible to perform a heating treatment on liquids in pipette tips through gas and the pipette tips heated within the box-shaped heating apparatus, some specimens or reagents may be stored at very low temperatures, and thus it takes time to rise the temperature to the reaction temperature. In addition, the box-shaped heating apparatus and liquid tanks (reagents in cartridges) are separate, and thus it is difficult to heat a large volume of liquid, including the liquids within the liquid tanks.

Further, in a method based on the techniques of the related art described above, that is, a method for heating both a pipette tip and a stage holding a cartridge while taking into account the ambient temperature by changing the control temperature by the ambient temperature, heating the reagent in the cartridge by using the heat block, heating the reagents in the pipette tips through the pipette tips and the gas using the box-shaped heating apparatus, or a combination thereof, there is a problem in that it is not possible to handle various reagent temperature conditions within a short time.

The present invention has been made in view of the problems described above, and it is an object of the present invention to realize a temperature adjustment system capable of controlling the reaction temperature to a target temperature within a desired reaction time and capable of improving control stability.

DETAILED DESCRIPTION OF THE DRAWINGS

One aspect of a temperature adjustment system according to the present invention is a system to be applied to an analysis apparatus that analyzes a sample by using a pipette tip and a reaction container, the temperature adjustment system comprising:

a driving section that raises and lowers the pipette tip;

a pipette tip temperature adjustment section that performs temperature adjustment of the pipette tip;

an environmental temperature sensor that senses at least an environmental temperature inside the analysis apparatus;

a pump for sucking a liquid into the pipette tip and discharging the liquid from the pipette tip; and a control section that sets in advance a temperature control target value of the pipette tip temperature adjustment section for use during sample analysis, based on the environmental temperature sensed by the environmental temperature sensor.

One aspect of a temperature adjustment method according to the present invention comprises:

an initial temperature adjustment step of setting a temperature control target value of a pipette temperature adjustment section to an initial temperature;

a reagent information read step;

a temperature-adjustment target value calculation step of calculating a temperature-adjustment target value, based on reagent information obtained in the reagent information read step and an environmental temperature sensed by an environmental temperature sensor;

a temperature control target value changing step of changing the temperature control target value to a temperature calculated in the temperature-adjustment target value calculation step;

a first temperature adjustment step of starting temperature adjustment, based on the changed temperature control target value;

a step of analyzing a sample; and an initial temperature-adjustment recovery step of setting the temperature control target value to the initial temperature after sample analysis, wherein the temperature control target value of the pipette tip temperature adjustment section for use during the sample analysis is changed in advance based on the environmental temperature before the sample analysis and analytical reagent information.

Advantageous Effects of Invention

According to the present invention, a temperature control target value of a pipette tip temperature adjustment section for use during sample analysis is set in advance on the basis of an environmental temperature sensed by an environmental temperature sensor. Accordingly, the reaction temperature can be controlled to a target temperature within a desired reaction time, and control stability can be improved.

DESCRIPTION OF EMBODIMENTS

The following describes embodiments of the present invention with reference to the drawings.

<1> First Embodiment

<1-1> Overall Configuration

Figure 1:
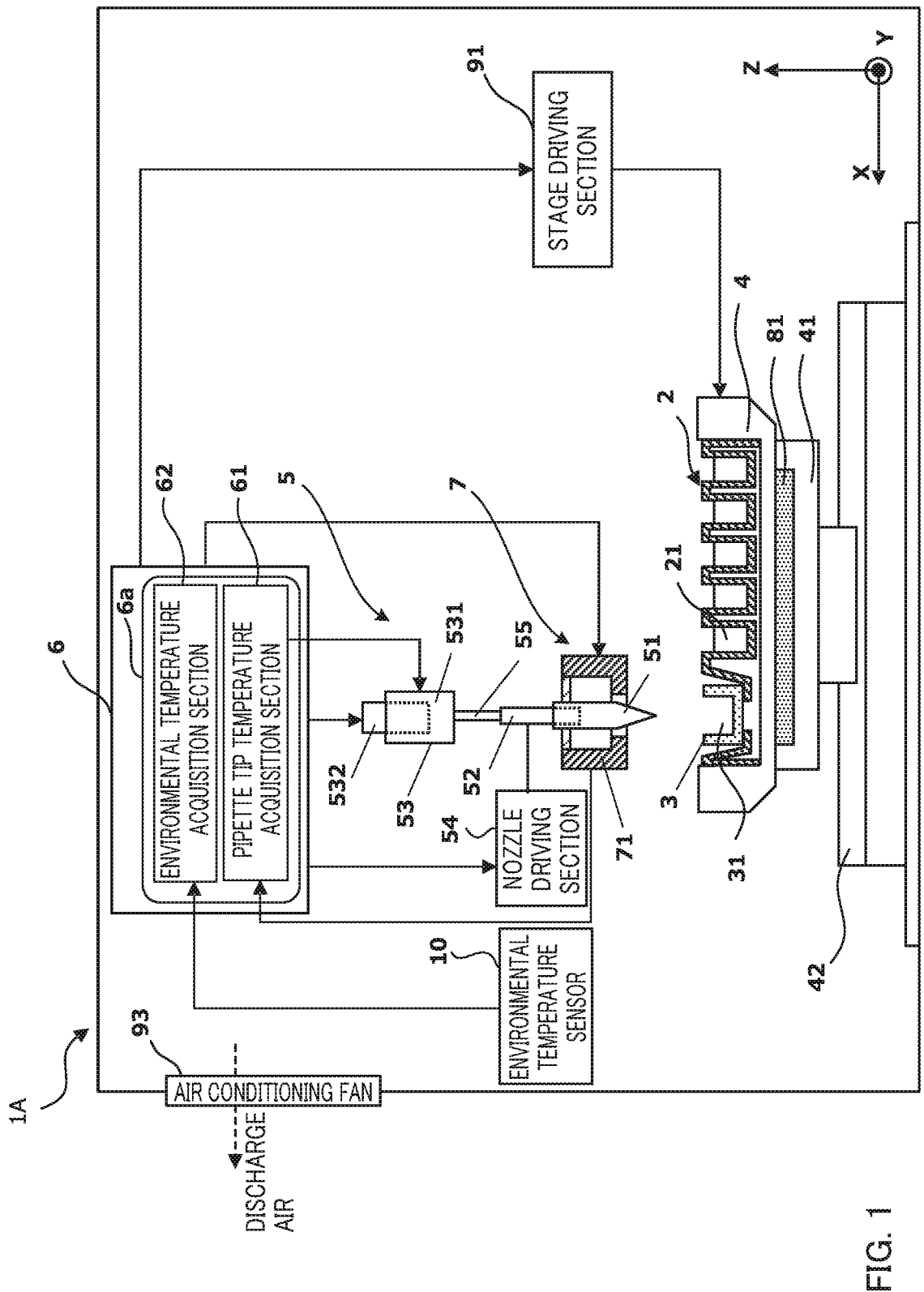
FIG. 1 is a schematic diagram illustrating an overall configuration of an analysis apparatus according to a first embodiment.

FIG. 1 is a schematic diagram illustrating an overall configuration of an analysis apparatus according to an embodiment.

Analysis apparatus 1A is an apparatus that analyzes a specimen by using pipette tip 51 for sucking in a sample such as reagents or a specimen in storage tank 21 and ejecting the sample into reaction container 3 to cause a reaction.

Inspection cartridge 2 according to this embodiment is a container including storage tanks 21 in which necessary reagents such as labeled antibodies or cleaning liquids are individually pre-packaged, and reaction container 3 for reacting the reagents with a specimen. Reaction container 3 may be a separate component independent of inspection cartridge 2. Inspection cartridge 2 is installed on stage 4 of analysis apparatus 1A in such a manner that a specimen containing a detection target substance is dispensed into predetermined storage tank 21 in advance. Examples of the specimen include blood, serum, plasma, urine, nasal fluids, saliva, and semen. Other examples of the specimen include a nucleic acid (such as DNA or RNA), a protein (such as polypeptide or oligopeptide), an amino acid, a carbohydrate, a lipid, and a modifying molecule thereof.

Inspection cartridge 2 includes reagent information (not illustrated). The reagent information is constituted by, for example, a character string, a one-dimensional barcode, a two-dimensional barcode, a semiconductor memory, a hologram film, or the like. The reagent information, which is constituted by a character string, has an advantage that it is easily recognizable to a person. The reagent information, which is constituted by a one-dimensional barcode or a two-dimensional barcode, has an advantage that it is inexpensive and excellent in mass production performance and provides a large amount of information. The reagent information, which is constituted by a semiconductor memory or a hologram film, has an advantage that it provides a large amount of information. In particular, it is desirable that the reagent information include both character string information, which is easily recognizable to a person, and a two-dimensional barcode, which is easily recognizable by an apparatus. With this configuration, the apparatus can stably obtain the reagent information, and a person who performs analysis can be prevented from analyzing a wrong reagent cartridge. The reagent information includes information on the type of the reagent and is configured to be compared with information such as the temperature dependence of the reactivity of the reagent accumulated in the apparatus. It is also desirable that the reagent information itself incorporate the type of the reagent and the temperature dependence of reactivity, for example, the temperature dependence of the reaction rate constant, thereby realizing a reaction system capable of flexible temperature control for various reagents.

Inspection cartridge 2 schematically illustrated in FIG. 1 is installed on stage 4. As illustrated in FIG. 1, for example, stage 4 is fixed onto slide base 41. When stage driving section 91 causes slide base 41 to horizontally move along linear guide section 42, stage 4 horizontally moves with inspection cartridge 2 held thereon.

Reaction container 3 has reaction tank 31 capable of accommodating a liquid. A liquid is injected into reaction tank 31 through tip 511 (FIG. 2) of pipette tip 51 inserted from an upper opening of reaction tank 31, and is removed.

A specimen containing a substance to be analyzed and reagents (reaction reagent) containing a substance that causes an antigen-antibody reaction with the substance to be analyzed are dispensed into reaction tank 31 of reaction container 3. After the dispensing treatment, information relating to the presence or degree of aggregation, color development, fluorescence, and so on, which result from the reaction occurring in reaction container 3, is acquired by an appropriate means, and the components of the specimen can be analyzed by using the acquired data.

Figure 2:
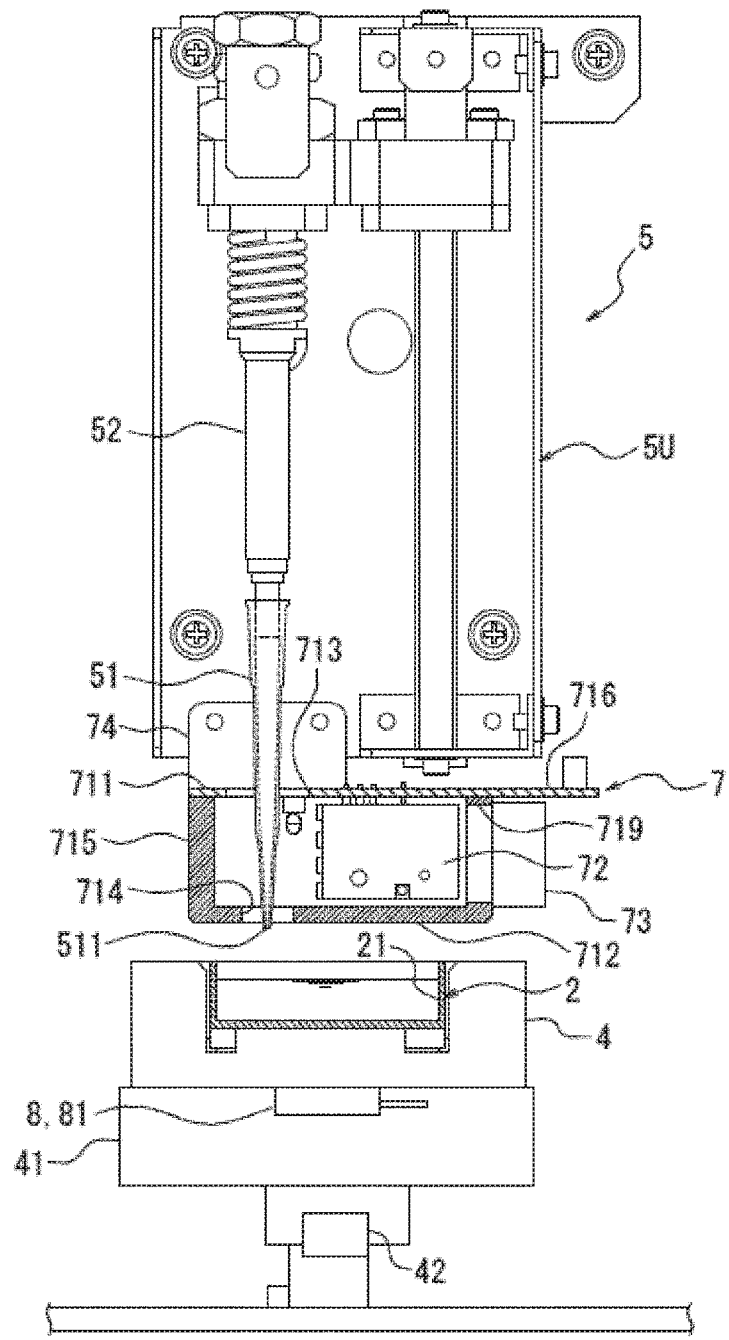
FIG. 2 is a side view illustrating a configuration of a liquid feed section.

As illustrated in FIG. 1 and FIG. 2, analysis apparatus 1A includes at least liquid feed section 5 that sucks and discharges a liquid into and from reaction tank 31 of reaction container 3, and control section 6 that controls the operation of liquid feed section 5.

Control section 6 includes temperature control section 6a.

Liquid feed section 5 includes pipette nozzle 52 having a tip to which pipette tip 51 is attached, pump 53 connected to pipette nozzle 52, and nozzle driving section 54 that causes raising and lowering movement of pipette nozzle 52. In FIG. 1, the components of analysis apparatus 1A, except for stage 4, liquid feed section 5, and control section 6, are not illustrated.

While this embodiment describes, as an example, a configuration in which pipette nozzle 52 and pipette tip 51 are separate, pipette nozzle 52 and pipette tip 51 may be integrated. In the following description, pipette nozzle 52 can be interpreted as a pipette tip.

In addition to the configuration described above, analysis apparatus 1A further includes environmental temperature sensor 10. Environmental temperature sensor 10 is configured to sense at least the environmental temperature inside analysis apparatus 1A. Environmental temperature sensor 10 may be configured to sense not only the environmental temperature inside analysis apparatus 1A but also the environmental temperature outside analysis apparatus 1A and output the internal and external environmental temperatures to environmental temperature acquisition section 62.

Pump 53 has syringe 531 and plunger 532 capable of reciprocating in syringe 531, and a driving section (not illustrated) including a driving motor (for example, a stepping motor) causes the reciprocating movement of plunger 532. Pump 53 is configured to cause plunger 532 to move in a reciprocating manner while being connected to pipette nozzle 52 via, for example, pipe 55, thereby quantitatively performing a process of sucking a liquid into pipette tip 51 from outside or discharging a liquid out of pipette tip 51. Further, the reciprocating operation of plunger 532 with respect to syringe 531 is repeated with tip 511 of pipette tip 51 being in proximity to the bottom surface of reaction tank 31 of reaction container 3. Accordingly, the liquid in reaction tank 31 is stirred, thereby achieving uniformity in the density of the liquid and promoting the reaction. The driving of pump 53 using the stepping motor enables the management of the amount of liquid to be fed from pipette tip 51 and the liquid feed rate and also enables the management of the amount of liquid remaining in reaction tank 31 of reaction container 3.

Nozzle driving section 54 is configured to freely move pipette nozzle 52 in the axial direction (in this embodiment, the vertical direction) by using, for example, a solenoid actuator or a stepping motor.

Liquid feed section 5 including pipette nozzle 52, pump 53, and nozzle driving section 54 can discharge and inject a specimen into reaction tank 31 of reaction container 3 and remove the liquid from within reaction tank 31 by absorbing the liquid. In this embodiment, as illustrated in FIG. 2, the components of liquid feed section 5 are formed as a unit and are configured to be handled as sampler unit 5U. In FIG. 2, pump 53 and so on are not illustrated.

As illustrated in FIG. 1 and FIG. 2, a temperature adjustment system according to this embodiment includes pipette tip temperature adjustment section 7 that heats pipette tip 51.

In the temperature adjustment system according to this embodiment, furthermore, temperature control section 6a of control section 6 sets in advance a temperature control target value of pipette tip temperature adjustment section 7 for use during sample analysis on the basis of the environmental temperature sensed by environmental temperature sensor 10. Accordingly, the temperature adjustment system of this embodiment can control a reaction temperature to a target temperature within a desired reaction time.

<1-2> Pipette Tip Temperature Adjustment Section

Pipette tip temperature adjustment section 7 is configured to intensively heat at least a tip portion of pipette tip 51 in pipette nozzle 52 positioned at a predetermined heating position by using hot air radiated from heat source 72.

Figure 3:
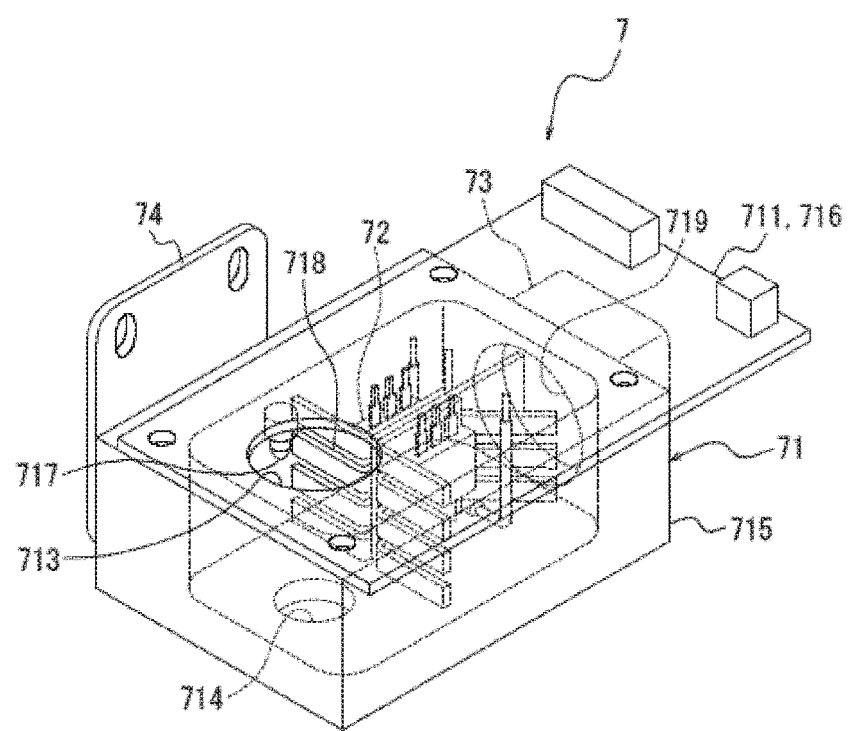
FIG. 3 is a perspective view illustrating a configuration of a pipette tip temperature adjustment section.

As illustrated in FIG. 1 to FIG. 3, pipette tip temperature adjustment section 7 according to this embodiment includes at least casing 71 capable of accommodating the tip portion of pipette tip 51, heat source 72 arranged within casing 71, and fan 73 that feeds the hot air radiated from heat source 72 in a predetermined direction, and heats the internal space of casing 71 by using the hot air radiated from heat source 72. Casing 71 has a box shape, and each of upper wall 711 and lower wall 712 of an outer wall thereof that partitions the internal space from outside has an opening through which the raising and lowering movement of pipette tip 51 is permitted.

Pipette tip temperature adjustment section 7 of this embodiment has, as the openings, insertion holes (upper-side insertion hole 713 and lower-side insertion hole 714) through which pipette tip 51 can be inserted. In this embodiment, casing 71 is configured using bottomed casing body 715 whose top is largely open, and top plate 716 arranged at a position to cover the top opening of casing body 715. Upper-side insertion hole 713 of casing 71 is a round hole formed in top plate 716, and lower-side insertion hole 714 of casing 71 is a round hole formed in the bottom of casing body 715. Upper-side insertion hole 713 and lower-side insertion hole 714 have a positional relationship such that upper-side insertion hole 713 and lower-side insertion hole 714 face each other in the vertical direction (the direction of the raising and lowering movement of pipette nozzle 52).

Pipette tip temperature adjustment section 7 can heat pipette tip 51 by applying the hot air radiated from heat source 72 to pipette tip 51 inserted into the internal space of casing 71 through upper-side insertion hole 713 and lower-side insertion hole 714.

Casing 71 has arranged therein sensor 717 (for example, a thermistor) capable of sensing the temperature in casing 71 and heat radiation fins 718 (FIG. 3). Heat radiation fins 718, which are provided with temperature fuses, function as a safety device. While fan 73 may be arranged in the internal space of casing 71, in this embodiment, fan 73 is fixed at a position outside casing 71 and facing fan opening 719 formed in the outer wall (in the illustrated example, a sidewall) of casing 71. With this structure, the hot air radiated from heat source 72 can be fed in a predetermined direction by fan 73. Minimizing the number of components arranged in casing 71 can reduce the size of casing 71, and the process of increasing the temperature of the internal space of casing 71 to a predetermined target temperature that is set in advance by using hot air and maintaining the temperature can be efficiently performed.

Pipette tip temperature adjustment section 7 is formed as a unit in such a manner that bracket 74 is fixed to casing 71. Bracket 74 is attached to sampler unit 5U, thereby fixing pipette tip temperature adjustment section 7 to sampler unit 5U (see FIG. 2).

Figure 4:
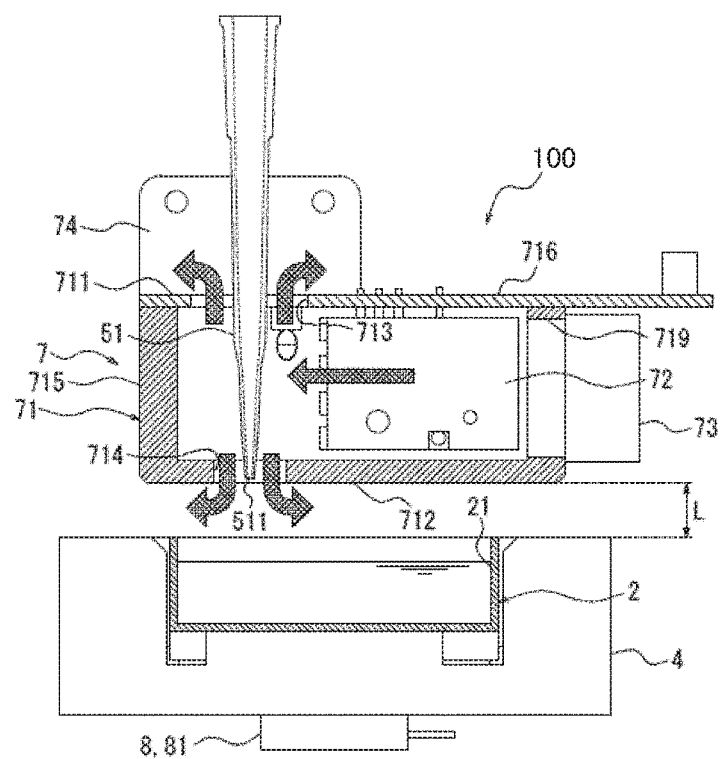
FIG. 4 is a side view illustrating how the pipette tip temperature adjustment section performs temperature adjustment.
Figure 5:
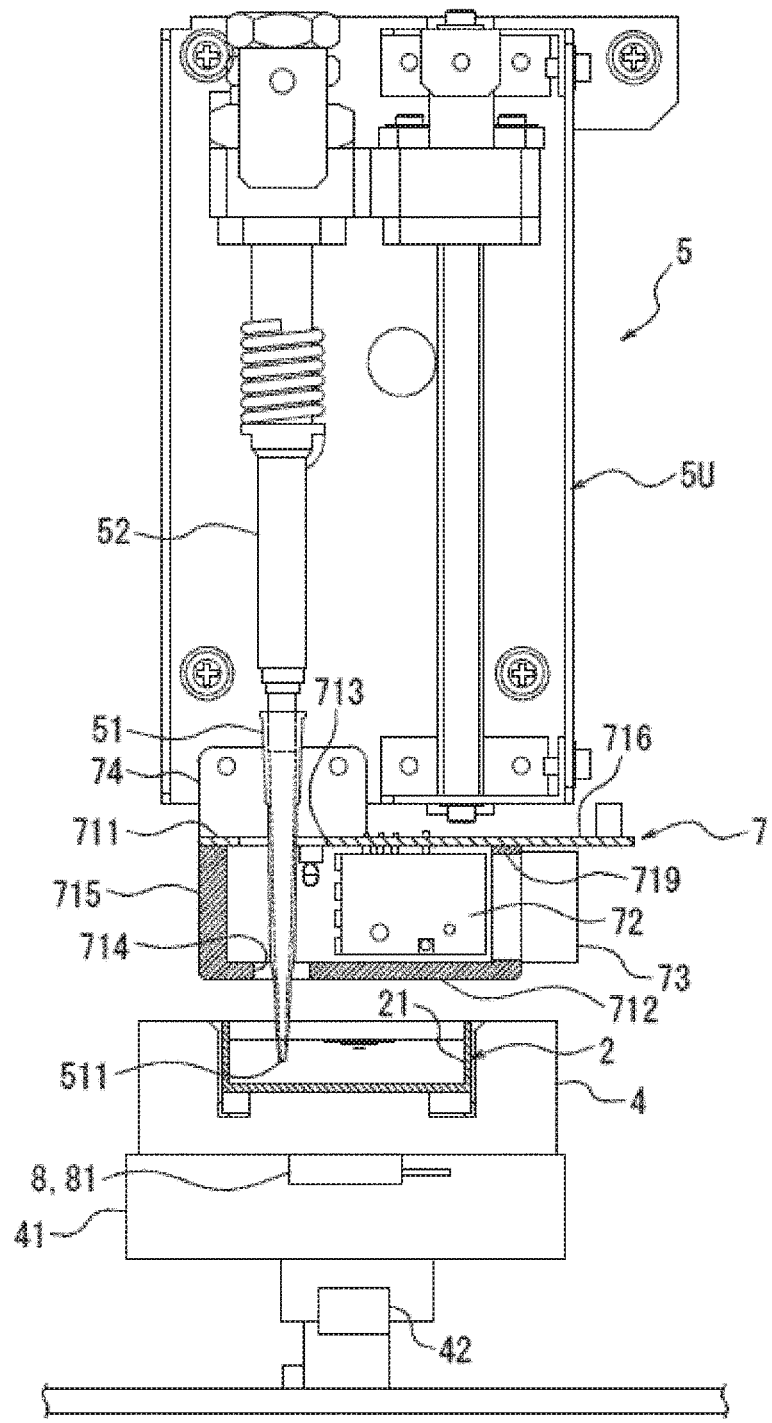
FIG. 5 is a side view illustrating a configuration of the liquid feed section.

In this embodiment, pipette tip temperature adjustment section 7 is arranged in the vicinity of reaction container 3. Specifically, as illustrated in FIG. 4, the distance from the lower end of pipette tip temperature adjustment section 7 (the bottom of casing 71) to the upper surface of the reaction container 3 (in FIG. 4, the distance denoted by "L") is set to, for example, about 5 mm. With the use of the layout described above, as illustrated in FIG. 4, reaction container 3 is exposed to the hot air radiated outward from within casing 71 through the insertion holes (particularly, lower-side insertion hole 714) of casing 71. In FIG. 4, the flow of the hot air generated from heat source 72 of pipette tip temperature adjustment section 7 is schematically indicated by relatively thick arrows.

Control section 6 is constituted by, for example, a known computer, microcomputer, or the like including an arithmetic operation device, a control device, a storage device, an input device, an output device, and so on. Control section 6 controls the operation of the components of analysis apparatus 1A, including liquid feed section 5, pipette tip temperature adjustment section 7, and reaction container temperature adjustment section 8, in accordance with a predetermined program. Temperature control section 6a of control section 6 includes pipette tip temperature acquisition section 61 that acquires from sensor 717 the temperature in casing 71 constituting pipette tip temperature adjustment section 7.

In the temperature adjustment system of analysis apparatus 1A according to this embodiment, analysis apparatus 1A starts measurement using inspection cartridge 2, and, during the execution of the process of detecting the detection target substance, control section 6 performs temperature adjustment control of reaction container temperature adjustment section 8 and pipette tip temperature adjustment section 7.

Control section 6 causes pipette tip temperature acquisition section 61 and environmental temperature acquisition section 62 to perform a temperature acquisition process at a suitable timing, and performs temperature adjustment control on the basis of the acquired temperatures so that a pipette tip temperature-adjustment temperature obtained by pipette tip temperature adjustment section 7 becomes close to a pipette tip temperature-adjustment target temperature.

The pipette tip temperature-adjustment target temperature is determined by control section 6 on the basis of the environmental temperature acquired by control section 6 using environmental temperature acquisition section 62 before the measurement is started and on the basis of the reagent information included in inspection cartridge 2. The pipette tip temperature-adjustment target temperature is held constant during the measurement. For example, the pipette tip temperature-adjustment target temperature is set in accordance with the reaction temperature of the reagent that depends on the environmental temperature included in the reagent information. With this setting, the effect of keeping reactivity constant regardless of the environmental temperature and the effect of preventing the temperature of a liquid having a predetermined temperature from decreasing when the liquid is sucked and discharged by pipette tip 51 can be expected, and the analysis performance can be expected to be stable. In addition, setting the temperature to a constant target value during the measurement can realize temperature control less susceptible to disturbance, and can improve the stability of the temperature control. Further, the pipette tip temperature-adjustment target temperature can be set to a temperature at which the adverse effect on the reagent or the heat deformation of pipette tip 51 itself is avoidable on the basis of the reagent information included in inspection cartridge 2.

As illustrated in FIG. 2 and FIG. 4, temperature adjustment system 100 of this embodiment is configured such that at least the tip portion of pipette tip 51 is accommodated in casing 71 in a state where pipette nozzle 52 is positioned at a predetermined heating position. Specifically, in a state where pipette nozzle 52 is positioned at the heating position, tip 511 of pipette tip 51 is positioned in lower-side insertion hole 714 of casing 71, and an area (tip portion) of pipette tip 51 having a predetermined dimension from the tip of pipette tip 51 is located within casing 71. In this embodiment, the origin position of pipette nozzle 52 is set to "heating position". By making pipette nozzle 52 in standby at the origin position, the tip portion of pipette tip 51 can be heated within casing 71.

In this embodiment, furthermore, in a state where pipette nozzle 52 is positioned at the heating position, a predetermined gap is formed between tip 511 of pipette tip 51 and lower-side insertion hole 714, and a predetermined gap is also formed between pipette tip 51 and upper-side insertion hole 713, so that pipette tip 51 is set so as not to come into contact with casing 71. The hot air in casing 71 is discharged to the outside of casing 71 through the gaps between pipette tip 51 and the insertion holes (upper-side insertion hole 713 and lower-side insertion hole 714), and the ambient temperature of casing 71 can be kept substantially at the same temperature as the internal temperature of casing 71 (see FIG. 4).

<1-3> Operation

Here, a process performed when temperature adjustment system 100 of analysis apparatus 1A according to this embodiment is used will be described. First, a user takes, from a refrigerator (not illustrated), inspection cartridge 2 stored at a temperature of about 2 to 8° C. The temperature of inspection cartridge 2 taken out from the refrigerator is returned to an indoor temperature of about 10 to 30° C.

Then, inspection cartridge 2 is installed on stage 4. Then, when a measurement start button (not illustrated) is operated, control section 6 drives stage driving section 91 to move stage 4 to a position at which storage tank 21 accommodating the liquid to be sucked is located immediately under pipette nozzle 52. In this state, only stage 4 is moved, but measurement is not actually started. Before the start of measurement, pipette tip temperature adjustment section 7 has performed an operation of blowing constant hot air to pipette tip 51 using an initial pipette tip temperature-adjustment target temperature as a target value.

Then, control section 6 determines the pipette tip temperature-adjustment target temperature on the basis of the environmental temperature acquired by environmental temperature acquisition section 62, the reagent information included in inspection cartridge 2, and the information on the temperature dependence of the reactivity of the reagent, which is stored in the apparatus. When the pipette tip temperature-adjustment target temperature is determined, pipette tip temperature adjustment section 7 changes (sets)

the control target value from the initial pipette tip temperature-adjustment target temperature to the calculated pipette tip temperature-adjustment target temperature and causes heat source 72 to radiate hot air to heat pipette nozzle 52 positioned at the heating position. Heat source 72 radiates hot air whose temperature ranges from 30 to 60° C. Further, the pipette tip temperature-adjustment target temperature is kept constant during the measurement.

Then, control section 6 causes the reaction process to proceed on the basis of the reagent information included in inspection cartridge 2 and step information of the reaction process of the reagent, which is stored in the apparatus, and outputs an analysis result. The reaction process includes a process of mixing the reagent contained in each storage tank 21 and the measurement target specimen by using pipette tip 51, a process of moving the liquid mixture to reaction tank 31 of reaction container 3 by using pipette tip 51, and a process of analyzing the liquid subjected to the reaction in the reaction tank 31 by using an analysis section (not illustrated).

After all of the processes in the reaction process are complete, control section 6 outputs an analysis result.

In this way, determining (setting) the pipette tip temperature-adjustment target temperature before the start of measurement (actual reaction) can keep the reactivity of the reagent constant, and the reactivity is expected to be stable. In particular, it is desirable to apply the present invention to an analysis apparatus that uses an antigen-antibody reaction. When an antigen-antibody reaction is performed, the antibody is dissociated after the completion of the reaction, and the rate of dissociation differs depending on the type of antibody. Accordingly, if the temperature changes in accordance with the environmental temperature in the reaction step, dissociation of the antibody is promoted, which may cause a deterioration of the signal-to-noise ratio during analysis and cause a reduction in analysis accuracy. Therefore, when an antibody with a high dissociation rate is used, a temperature-adjustment target value needs to be set and changed in advance in accordance with the environmental temperature. Here, the term high dissociation rate refers to an antigen-antibody reaction in which the temperature dependence of the dissociation constant at a normal temperature of 23° C. is greater than or equal to 1% at 1° C., and more typically, greater than or equal to 10% at 1° C.

<1-4> Summary

As described above, according to this embodiment, a temperature adjustment system to be applied to analysis apparatus 1A that analyzes a sample by using pipette tip 51 and reaction container 3 includes driving section 54 that raises and lowers pipette tip 51, pipette tip temperature adjustment section 7 that performs temperature adjustment of pipette tip 51, environmental temperature sensor 10 that senses at least the environmental temperature inside analysis apparatus 1A, pump 53 for sucking a liquid into pipette tip 51 and discharging the liquid from pipette tip 51, and temperature control section 6a that sets in advance a temperature control target value of pipette tip temperature adjustment section 7 for use during sample analysis on the basis of the environmental temperature sensed by environmental temperature sensor 10. During the sample analysis, driving section 54 lowers pipette tip 51, and pump 53 performs a suction and discharge operation of repeatedly performing the suction and the discharge in a state where pipette tip temperature adjustment section 7 feeds air to pipette tip 51; and temperature control section 6a sets in advance the temperature control target value of pipette tip temperature adjustment section 7 for use during the sample analysis on the basis of analytical reagent information and the environmental temperature sensed by environmental temperature sensor 10 before the sample analysis.

With this configuration, the reaction temperature can be controlled to a target temperature within a desired reaction time. In addition, adjusting control in advance based on the analytical reagent information can improve control stability.

<2> Second Embodiment

Figure 6:
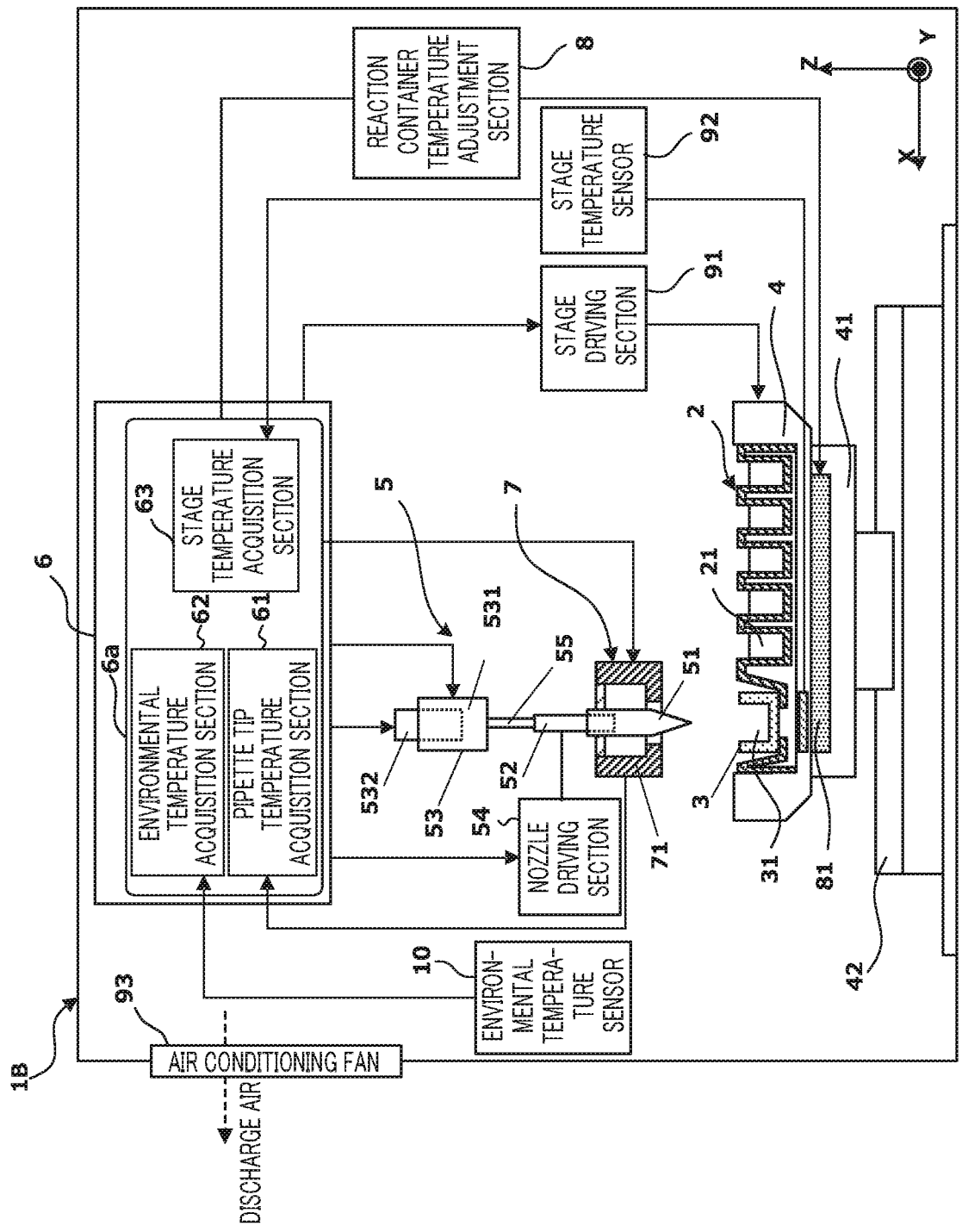
FIG. 6 is a schematic diagram illustrating an overall configuration of an analysis apparatus according to a second embodiment.

FIG. 6, in which corresponding portions to those in FIG. 1 are assigned the same numerals, is a schematic diagram illustrating an overall configuration of analysis apparatus 1B according to a second embodiment.

Analysis apparatus 1B of this embodiment includes reaction container temperature adjustment section 8. Reaction container temperature adjustment section 8 is configured to include stage temperature-adjustment heater 81 that heats stage 4. Stage 4 is heated by stage temperature-adjustment heater 81, thereby heating reaction container 3 arranged on stage 4.

In this embodiment, the temperature of stage 4, which is heated by stage temperature-adjustment heater 81, is sensed by stage temperature sensor 92. Stage temperature sensor 92 is desirably in contact with stage 4 and is more desirably arranged between stage temperature-adjustment heater 81 and reaction container 3. With this arrangement, the temperature of stage 4, which is heated by stage temperature-adjustment heater 81, can be directly measured, and measurement stability and control stability can be improved. Further, this embodiment provides a configuration in which the temperature of stage 4 is acquired to indirectly acquire the temperature of reaction container 3.

In a temperature adjustment system of analysis apparatus 1B according to this embodiment, analysis apparatus 1 starts measurement using inspection cartridge 2, and, during the execution of the process of detecting the detection target substance, control section 6 performs temperature adjustment control of reaction container temperature adjustment section 8 and pipette tip temperature adjustment section 7. Control section 6 causes pipette tip temperature acquisition section 61 and stage temperature acquisition section 63 to perform a temperature acquisition process at a suitable timing, and performs temperature adjustment control on the basis of the acquired temperatures so that a pipette tip temperature-adjustment temperature obtained by pipette tip temperature adjustment section 7 and a reaction container temperature-adjustment temperature (stage temperature-adjustment temperature) obtained by reaction container temperature adjustment section 8 become close to a preset pipette tip temperature-adjustment target temperature and reaction container temperature-adjustment target temperature (stage temperature-adjustment target temperature), respectively.

The method for determining the pipette tip temperature-adjustment target temperature is performed in a way similar to that in the first embodiment illustrated in FIG. 1. Specifically, the pipette tip temperature-adjustment target temperature is determined on the basis of the environmental temperature acquired by environmental temperature acquisition section 62, the reagent information included in inspection cartridge 2, and information on the temperature dependence of the reactivity of the reagent, which is stored in the apparatus.

Further, the reaction container temperature-adjustment target temperature (stage temperature-adjustment target temperature) of reaction container temperature adjustment section 8 is set to be lower than the pipette tip temperature-adjustment target temperature. With this setting, the disturbance provided to pipette tip temperature adjustment section 7 by reaction container temperature adjustment section 8 can be suppressed, and the control stability of the reaction temperature can be improved.

The following describes the reason that temperature control stability is improved in the temperature adjustment system illustrated in FIG. 6.

In the temperature adjustment system illustrated in FIG. 6, pipette tip temperature adjustment section 7 is arranged on an upper side of a heat source of stage temperature-adjustment heater 81 controlled by reaction container temperature adjustment section 8. Accordingly, the heat heated by stage temperature-adjustment heater 81 is input as a disturbance to pipette tip temperature adjustment section 7 by convection.

Assuming that a control target temperature of reaction container temperature adjustment section 8 is set to be higher than a set temperature of pipette tip temperature adjustment section 7, the air heated by stage temperature-adjustment heater 81 needs to be cooled by pipette tip temperature adjustment section 7 using a cooling mechanism. Pipette tip temperature adjustment section 7, when including a heat pipe or a heat radiation structure for cooling, increases in complexity or size, causing a problem in that manufacturing cost or variation increases.

In contrast, as in this embodiment, assuming that the control target temperature of reaction container temperature adjustment section 8 is set to be lower than the set temperature of pipette tip temperature adjustment section 7, the structure of pipette tip temperature adjustment section 7 can be constituted only by a heating source with a heater, thereby achieving the advantages of a simplified configuration of pipette tip temperature adjustment section 7, a reduction in the number of components used, and a reduction in the manufacturing cost and manufacturing variation. In addition, the air heated once by stage temperature-adjustment heater 81 does not need to be cooled by pipette tip temperature adjustment section 7, thereby achieving the advantages of a reduction in the total power consumption of pipette tip temperature adjustment section 7 and reaction container temperature adjustment section 8 and an improvement in control stability.

As described above, the temperature adjustment system of this embodiment further includes reaction container temperature adjustment section 8 that controls the temperature of reaction container 3, in addition to the configuration of the first embodiment, and the control target temperature of reaction container temperature adjustment section 8 is set to be lower than the set temperature of pipette tip temperature adjustment section 7. Accordingly, the reaction temperature can be controlled to a target temperature within a desired reaction time, and adjusting control in advance based on the analytical reagent information can improve control stability. In addition, the disturbance provided to pipette tip temperature adjustment section 7 by reaction container temperature adjustment section 8 can be suppressed, and the control stability of the reaction temperature can be improved.

<3> Third Embodiment

This embodiment presents an application of a temperature adjustment system of the present invention to an inspection system that utilizes surface plasmon resonance.

Conventionally, there is known an inspection system that utilizes surface plasmon resonance to acquire diagnostic data of various diseases (see Japanese Patent Application No. 2015-148500). The inspection system includes a detection chip (sensor chip) for performing a biological reaction required for diagnosis of a disease, and a detection device (SPFS device) that sets the sensor chip to detect a biological reaction by using surface plasmon resonance excitation enhanced fluorescence spectroscopy (SPFS method).

The sensor chip has a fine flow path for immunoassay having an open inlet port and an open outlet port, and the bottom of the flow path is constituted by a dielectric member, a thin metal film formed on an upper surface of the dielectric member, and a fine-flow-path forming member disposed on top of the thin metal film.

An antibody (ligand) or the like is fixed to at least a portion of the metal film. When a patient-derived blood sample (liquid specimen) or the like is caused to flow into the reaction field, a (disease-related) biomolecule contained in the liquid specimen is specifically captured on the fixed antibody by an antigen-antibody reaction. Further, after a fluorescently labeled secondary antibody is specifically bound to a portion (epitope) different from the antibody-binding portion of the captured biomolecule, the detection device performs the SPFS method to detect the presence of the capture, thereby detecting whether the biomolecule is contained in a biopsy sample. A predetermined region where a ligand or the like is fixed and a biological reaction is carried out is referred to as "reaction field".

This biological reaction is carried out in the reaction field in the sensor chip, and the efficiency of the biological reaction changes by the temperature of the reaction solution in the reaction field (the temperature of the reaction field). Thus, the temperature of the reaction field is adjusted to a temperature suitable for the biological reaction by using a temperature adjustment means such as a heater.

As a result of studies on the conventional inspection system, the inventors of the present invention have found the following problem and have conceived of a temperature adjustment system of this embodiment. When a reciprocating liquid feed for causing at least a portion of the reaction solution, which is caused to flow into the flow path in the sensor chip, to flow out of the flow path and to flow back into the flow path is performed to increase the efficiency of a biological reaction, (1) the reaction solution flowing out of the flow path by the reciprocating liquid feed is exposed to a temperature environment different from the temperature in the flow path (e.g.; a temperature environment whose temperature is lower than the temperature in the flow path due to the influence of the temperature in the SPFS device), causing a change in the temperature of the reaction solution, and the flow of the reaction solution back into the flow path causes a change in the temperature of the reaction field in the flow path, resulting in a deviation from the target biological reaction temperature, and (2) as a result of a single reciprocating liquid feed, the temperature of the reaction field fluctuates per reciprocating liquid feed, and the intended biological reaction may not be performed under suitable temperature conditions.

The reciprocating liquid feed described here corresponds to a "suction and discharge operation of repeatedly performing suction and discharge" in the first and second embodiments described above. Also, the inventors of the present invention have found the following problem. After the antigen-antibody reaction is performed, it is necessary to move a stage to which a sensor chip is fixed from a reaction position to a measurement position in order for the detection device to perform fluorescence measurement, and the movement of the stage causes the generation of air in the apparatus, which affects a control characteristic of a pipette tip temperature adjustment section.

A third embodiment of a temperature adjustment system according to the present invention can address the problem described above regarding temperature control stabilization, and can provide an inspection system capable of performing an intended biological reaction under temperature conditions suitable for the biological reaction even when a reciprocating liquid feed is performed or a stage to which a sensor chip is fixed is moved during analysis.

Figure 7:
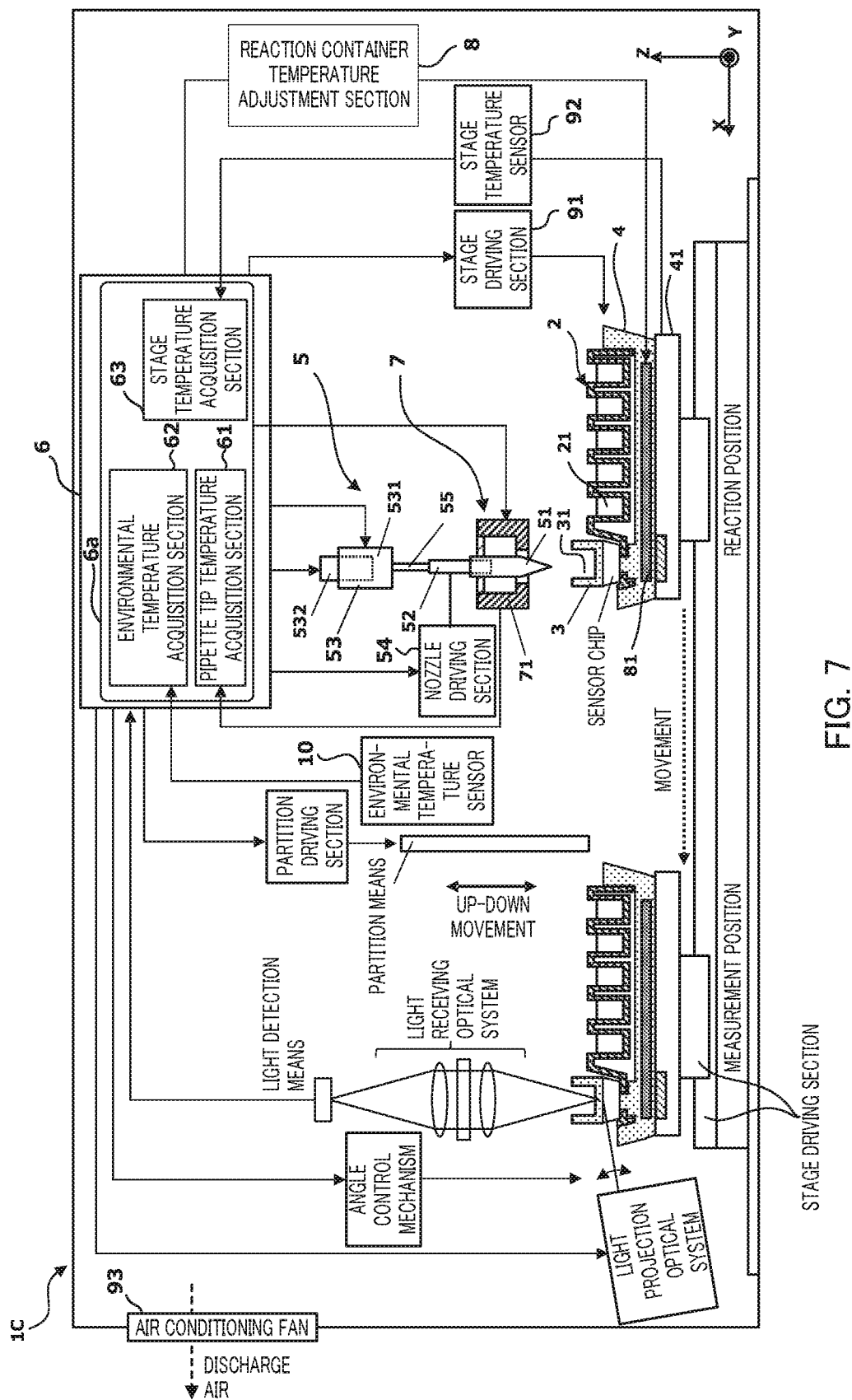
FIG. 7 is a schematic diagram illustrating an overall configuration of an analysis apparatus according to a third embodiment.

FIG. 7, in which corresponding portions to those in FIG. 6 are assigned the same numerals, is a schematic diagram illustrating an overall configuration of analysis apparatus 1C according to this embodiment. Analysis apparatus 1C performs an inspection using surface plasmon resonance.

Compared with analysis apparatus 1B in FIG. 6, analysis apparatus 1C of this embodiment includes stage driving section 91 that causes reaction container 3 to horizontally move between a reaction position and a measurement position, a partition means, a partition driving section, and so on. The partition means is a partition plate or the like that partitions the space of the reaction position and the space of the measurement position, and is moved in an up-down direction by the partition driving section. Stage driving section 91, the partition means, the partition driving section, a light projection optical system, an angle control mechanism, a light receiving optical system, and a light detection means, which are illustrated in FIG. 7, are known techniques described in Japanese Patent Application No. 2015-148500 and so on and will not be described here.

Analysis apparatus 1C of this embodiment is a temperature adjustment system to be applied to analysis apparatus 1C that analyzes a sample by using pipette tip 51 and reaction container 3, and includes driving section 54 that raises and lowers pipette tip 51, stage driving section 91 that moves reaction container 3, pipette tip temperature adjustment section 7 that performs temperature adjustment of pipette tip 51, environmental temperature sensor 10 that senses at least the environmental temperature inside analysis apparatus 1C, and pump 53 for sucking a liquid into pipette tip 51 and discharging the liquid from pipette tip 51. In analysis apparatus 1C, during sample analysis, pipette tip 51 is lowered by driving section 54, and pump 53 performs a suction and discharge operation of repeatedly performing the suction and the discharge in a state where pipette tip temperature adjustment section 7 feeds air to pipette tip 51; a sample analysis step includes a step of performing a suction and discharge operation using pipette tip 51 when reaction container 3 is in a reaction position, and a step of performing measurement when reaction container 3 is in a measurement position; and a temperature control target value of pipette tip temperature adjustment section 7 for use during the sample analysis is set in advance on the basis of the measured value of environmental temperature sensor 10 before the sample analysis and analytical reagent information.

With this configuration, the fluctuation of the temperature of the reaction field during a reciprocating liquid feed, and reaction field temperature variation depending on the movement of air generated in the apparatus in accordance with the movement of the stage can be reduced.

<4> Fourth Embodiment

This embodiment presents a configuration of environmental temperature sensor 10 (FIG. 1, FIG. 6, and FIG. 7) suitable for implementation of the present invention.

A temperature adjustment system of this embodiment has a configuration in which, in the configuration illustrated in FIG. 1, FIG. 6, or FIG. 7, environmental temperature sensor 10 is configured such that at least one environmental temperature sensor 10 is included in an analysis apparatus and is configured to have a path having length L along which heat can be transferred to environmental temperature sensor 10 via a heat transfer medium that transfers heat from the exterior of the analysis apparatus, where length L is less than or equal to thermal diffusion distance $L_D$ represented by (Expression 1) below when $\alpha$ [mm²/s] denotes the thermal diffusivity of the heat transfer medium, $\lambda$ [W/(m·K)] denotes the thermal conductivity of the heat transfer medium, Cp [J/(kg·K)] denotes the specific heat of the heat transfer medium at constant pressure, $\rho$ [kg/m³] denotes the density of the heat transfer medium, and $t_{mes}$ [s] denotes the time required to analyze the sample.

[1]

$$L_D = 2\sqrt{\alpha \times \frac{t_{mes}}{10}}$$ (Expression 1)

$$\alpha = \frac{\lambda}{\rho C_p}$$

$$L_1 \leq L_D$$

Further, the temperature adjustment system of this embodiment has a configuration in which during sample analysis, pipette tip 51 is lowered by driving section 54 that raises and lowers pipette tip 51, and pump 53 performs a suction and discharge operation of repeatedly performing suction and discharge in a state where pipette tip temperature adjustment section 7 performs temperature adjustment on pipette tip 51; and the temperature control target value of pipette tip temperature adjustment section 7 for use during the sample analysis is changed (set) in advance on the basis of the measured value of environmental temperature sensor 10 before the sample analysis and analytical reagent information.

With this configuration, the influence of the temperature outside the analysis apparatus on the temperature inside the analysis apparatus can be sensed more quickly than the sample analysis time, and the stability of temperature control within the analysis time can be improved even if the environmental temperature changes before analysis.

Example parameters of a medium that transfers heat, which are given in (Expression 1), are shown in Table 1. For example, when the heat transfer medium that transfers heat from the exterior of the analysis apparatus is air, the thermal diffusion length is 73 [mm], given that analysis time $t_{mes}$=600 [s]. Thus, it is desirable that at least one environmental temperature sensor 10 be disposed in a location at a distance less than or equal to 73 mm from the exterior of the analysis apparatus to the temperature sensor. Likewise, when the heat transfer medium that transfers heat from the exterior of the analysis apparatus is assumed to be plastic (epoxy resin) and a temperature sensor is installed from the exterior of the apparatus toward the inside of the apparatus in such a manner that the temperature sensor is sealed in the plastic (epoxy resin), it is desirable that at least one environmental temperature sensor 10 be disposed in a location at a distance less than or equal to 6 [mm] from the exterior of the apparatus to the temperature sensor. When a sensor is installed from the exterior of the apparatus toward the inside of the apparatus in such a manner that the sensor comes into contact with metal (industrial aluminum), it is desirable that at least one environmental temperature sensor 10 be disposed in a location at a distance less than or equal to 147 [mm] from the exterior of the apparatus to the temperature sensor.

In Table 1, the physical properties at 300 K are calculated as representatives. Desirably, physical parameters are switched in accordance with the environmental temperature at which the apparatus is used. For example, when the apparatus is used at 323 K, it is desirable to use the physical parameters at 323 K. Accordingly, by calculating the thermal diffusion distance by using the physical parameters suitable for the environmental temperature, the responsivity of environmental temperature sensor 10 to a change in environmental temperature can be set more quickly than the sample analysis time. The stability of temperature control can be improved.

length L is less than or equal to thermal diffusion distance $L_D$ represented by (Expression 1) when $\alpha$ [mm$^2$/s] denotes the thermal diffusivity of the heat transfer medium, $\lambda$ [W/(m·K)] denotes the thermal conductivity of the heat transfer medium, Cp [J/(kg·K)] denotes the specific heat of the heat transfer medium at constant pressure, $\rho$ [kg/m$^3$] denotes the density of the heat transfer medium, and $t_{mes}$ [s] denotes the time required to analyze the sample.

With this configuration, it is possible to accurately measure the environmental temperature of the surroundings of the analysis apparatus. Additionally, environmental temperature sensor 10 is disposed within the apparatus, thereby reducing a temperature measurement error caused by a change in air velocity around the analysis apparatus. In addition, measurement of the apparatus internal average temperature also taking into account a spatial temperature distribution within the apparatus is achieved, and temperature controllability can be improved.

TABLE 1

Table 1 Thermal Diffusion Length List

| Heat transfer medium | Air (Temperature: 300 K) | Industrial pure aluminum A1100 (Temperature: 300 K) | Plastic epoxy resin (Temperature: 300 K) | Plastic acrylic resin (Temperature: 300 K) | Stainless steel SUS 405 (Temperature: 300 K) |
|---|---|---|---|---|---|
| Thermal conductivity $\lambda$ [W/(m · K)] | 0.02614 | 222 | 0.3 | 0.21 | 16 |
| Specific heat at constant pressure $C_p$ [J/(kg · K)] | 1007 | 904 | 1100 | 1400 | 499 |
| Density $\rho$ [kg/m$^3$] | 1.1763 | 2710 | 1850 | 1190 | 7920 |
| Thermal diffusivity $\alpha$ [mm$^2$/s] | 22.07 | 90.62 | 0.15 | 0.13 | 4.05 |

| Sample analysis time $T_{mes}$ [S] | Thermal diffusion length $L_D$ [mm] | Thermal diffusion length $L_D$ [mm] | Thermal diffusion length $L_D$ [mm] | Thermal diffusion length $L_D$ [mm] | Thermal diffusion length $L_D$ [mm] |
|---|---|---|---|---|---|
| 1 | 3.0 | 6.0 | 0.2 | 0.2 | 1.3 |
| 10 | 9.4 | 19.0 | 0.8 | 0.7 | 4.0 |
| 30 | 16.3 | 33.0 | 1.3 | 1.2 | 7.0 |
| 60 | 23.0 | 46.6 | 1.9 | 1.7 | 9.9 |
| 120 | 32.5 | 66.0 | 2.7 | 2.5 | 13.9 |
| 180 | 39.9 | 80.8 | 3.3 | 3.0 | 17.1 |
| 300 | 51.5 | 104.3 | 4.2 | 3.9 | 22.0 |
| 600 | 72.8 | 147.5 | 5.9 | 5.5 | 31.2 |
| 3600 | 178.3 | 361.2 | 14.6 | 13.5 | 76.4 |

When environmental temperature sensor 10 for sensing the temperature of the outside of the analysis apparatus is disposed, environmental temperature sensor 10 is desirably disposed in at least one or more locations. More desirably, at least six or more environmental temperature sensors 10 are desirably located within the analysis apparatus and near the exterior of the apparatus. This indicates that a three-dimensional spatial coordinate system (x, y, z) is used and that the spatial temperature is measured at six points {+x, −x, +y, −y, +z, −z}. Desirably, the six environmental temperature sensors 10 are all included in the apparatus in (Expression 1), each environmental temperature sensor 10 having a path having length L along which heat can be transferred to the sensor via a heat transfer medium that transfers heat from the exterior of the apparatus, where As environmental temperature sensor 10, furthermore, a second environmental temperature sensor is desirably installed near a heat generating source or a heat absorbing source of pipette tip temperature adjustment section 7.

More specifically, the second environmental temperature sensor is desirably configured to be thermally coupled from the heat generation or heat absorbing source of pipette tip temperature adjustment section 7 via a second heat transfer medium, to be included in the apparatus, and to have a path having length L2 along which heat can be transferred to the sensor via the second heat transfer medium that transfers heat from the heat generation or heat absorbing source of pipette tip temperature adjustment section 7, where length $L_2$ is less than or equal to thermal diffusion distance $L_{D2}$ represented by (Expression 2) below when $\alpha_2$ [mm$^2$/s]

denotes the thermal diffusivity of the second heat transfer medium, $\lambda_2$ [W/(m·K)] denotes the thermal conductivity of the second heat transfer medium, $C_{p2}$ [J/(kg·K)] denotes the specific heat of the second heat transfer medium at constant pressure, $\rho_2$ [kg/m$^3$] denotes the density of the second heat transfer medium, and $t_{mes}$ [s] denotes the time required to analyze the sample.

[2]

$$L_{D2} = 2\sqrt{\alpha_2 \times \frac{t_{mes}}{10}}$$ (Expression 2)

$$\alpha_2 = \frac{h}{\rho_2 C_{p2}}$$

$$L_2 \leq L_{D2}$$

With this configuration, the influence of the temperature change caused by heat generated or absorbed by pipette tip temperature adjustment section 7 on the internal environment can be sensed more quickly than the sample analysis time, and the stability of temperature control within the analysis time can be improved even if the environmental temperature changes before analysis.

Thermal diffusion distance $L_{D2}$ is calculated in a way similar to that for thermal diffusion length $L_{D1}$ and has a value shown in Table 1. Accordingly, the second environmental temperature sensor is thermally coupled from the heat generation or heat absorbing source of pipette tip temperature adjustment section 7 via air as the second heat transfer medium, and the thermal diffusion length is 73 [mm], given that analysis time $t_{mes}$=600 [s]. Thus, it is desirable that the second environmental temperature sensor be located in a location at a distance less than or equal to 73 mm from the heat generation or heat absorbing source of pipette tip temperature adjustment section 7 to the second environmental temperature sensor. Likewise, when the second environmental temperature sensor is installed via plastic serving as a second heat transfer medium from the heat generation or heat absorbing source of pipette tip temperature adjustment section 7 in such a manner that the temperature sensor is sealed in the plastic (epoxy resin), it is desirable that the second environmental temperature sensor be located in a location at a distance less than or equal to 6 [mm] from the heat generation or heat absorbing source of pipette tip temperature adjustment section 7 to the second environmental temperature sensor. When the second environmental temperature sensor is installed via metal (industrial aluminum) serving as a second heat transfer medium from the heat generation or heat absorbing source of pipette tip temperature adjustment section 7 in such a manner that the sensor comes into contact with metal (industrial aluminum), it is desirable that second environmental temperature sensor be located in a location at a distance less than or equal to 147 [mm] from the heat generation or heat absorbing source of pipette tip temperature adjustment section 7 to the second environmental temperature sensor.

In Table 1, the physical properties at 300 K are calculated as representatives. Desirably, physical parameters are switched in accordance with the presumable apparatus average internal temperature inside the apparatus. For example, when the presumable apparatus average internal temperature inside the apparatus is used at 330 K, it is desirable to use the physical parameters at 330 K. Accordingly, by calculating the thermal diffusion distance by using the physical parameters suitable for the presumable apparatus average internal temperature inside the apparatus, the responsivity of the second environmental temperature sensor to a change in apparatus internal temperature can be set more quickly than the sample analysis time. The stability of temperature control can be improved.

The following describes the meaning of the thermal diffusion length given in (Expression 1) and (Expression 2). For example, as given in Kinshi ITOH and Naoki KUNIMINE, "toraburu wo sakeru tame no denshi kiki no netsu taisaku (thermal design of electronic devices to avoid possible problems)" 2nd ed. Vol. 7, Nikkan Kogyo Shimbun, Ltd. (2016), the primitive equation for heat transfer is given by

[3]

$$\frac{\partial T}{\partial t} = \alpha \left( \frac{\partial^2 T}{\partial x^2} + \frac{\partial^2 T}{\partial y^2} + \frac{\partial^2 T}{\partial z^2} \right).$$ (Expression 3)

Here, T denotes temperature, t denotes time, and (x, y, z) denotes spatial coordinates. Further, $\alpha$ denotes thermal diffusivity, like the symbol $\alpha$ given in (Expression 1). The thermal diffusivity is a parameter representing how fast the temperature change is transferred within a substance, and the larger $\alpha$ is, the faster the temperature change is.

Assuming thermal conduction only in the one-dimensional x direction, (Expression 3) is modified to

[4]

$$\frac{\partial T}{\partial t} = \alpha \frac{\partial^2 T}{\partial x^2},$$ (Expression 4)

taking into account that the spatial derivatives in the y direction and the z direction are 0. The exact solution when, as an initial condition, a temperature change is applied to a very small width of the origin from initial temperature $T_o$ in a δ-function manner is given by

[5]

$$T(t, x) = T_o + \sqrt{\frac{\Delta t}{t}} T_{\Delta t} \exp\left( -\frac{x^2}{4\alpha t} \right).$$ (Expression 5)

It is confirmed by substitution that (Expression 5) is the solution of the partial differential equation given in (Expression 4). Here, $\Delta t$ denotes a small amount of time during which a temperature change is applied in a δ-function manner (a small amount sufficiently smaller than 1/100 of the analysis time, such as 6 [s], and more desirably, 0.6 [s], given that, for example, analysis time $t_{mes}$=600 [s]), and $T_{\Delta t}$ denotes the amount of temperature change of the origin relative to $T_o$ at time $\Delta t$. From (Expression 5), half-width $L_{1/2}$ of the temperature distribution at a desired time is calculated by (Expression 6)

$$L_{1/2} = 2\sqrt{\alpha t}$$ [6]

Assuming that $t=t_{mes}/10$, this expression matches (Expression 1). That is, the thermal diffusion length defined in (Expression 1) represents the distance over which the initially applied temperature change reaches within 1/10 of the analysis time. Arranging environmental temperature sensor 10 at a distance shorter than the thermal diffusion length allows the temperature change to be sensed at a time sufficiently earlier than the analysis time, and the stability of temperature control can be improved.

As environmental temperature sensor 10, furthermore, when reaction container temperature adjustment section 8 that controls the temperature of reaction container 3 is included, a third environmental temperature sensor is desirably installed near a heat generating source or heat absorbing source of reaction container temperature adjustment section 8.

More specifically, the third environmental temperature sensor is desirably configured to be thermally coupled from the heat generation or heat absorbing source of reaction container temperature adjustment section 8 via a third heat transfer medium, to be included in the apparatus, and to have a path having length $L_3$ along which heat can be transferred to the sensor via the third heat transfer medium that transfers heat from the heat generation or heat absorbing source of reaction container temperature adjustment section 8, where length $L_3$ is less than or equal to thermal diffusion distance $L_{D3}$ represented by (Expression 7) below when $\alpha_3$ [mm²/s] denotes the thermal diffusivity of the third heat transfer medium, $\lambda_3$ [W/(m·K)] denotes the thermal conductivity of the third heat transfer medium, $C_{p3}$ [J/(kg·K)] denotes the specific heat of the third heat transfer medium at constant pressure, $\rho_3$ [kg/m³] denotes the density of the third heat transfer medium, and $t_{mes}$ [s] denotes the time required to analyze the sample.

[7]

$$L_{D3} = 2\sqrt{\alpha_3 \times \frac{t_{mes}}{10}}$$ (Expression 7)

$$\alpha_3 = \frac{\lambda_3}{\rho_3 C_{p3}}$$

$$L_3 \leq L_{D3}$$

With this configuration, the influence of the temperature change caused by heat generated or absorbed by reaction container temperature adjustment section 8 on the internal environment can be sensed more quickly than the sample analysis time, and the stability of temperature control within the analysis time can be improved even if the environmental temperature changes before analysis.

Thermal diffusion distance $L_{D3}$ is calculated in a way similar to that for thermal diffusion length $L_{D1}$ and has a value shown in Table 1. Accordingly, the third environmental temperature sensor is thermally coupled from the heat generation or heat absorbing source of reaction container temperature adjustment section 8 via air as the third heat transfer medium, and the thermal diffusion length is 73 [mm], given that analysis time $t_{mes}$=600 [s]. Thus, it is desirable that the third environmental temperature sensor be located in a location at a distance less than or equal to 73 mm from the heat generation or heat absorbing source of reaction container temperature adjustment section 8 to the third environmental temperature sensor. Likewise, when the third environmental temperature sensor is installed via plastic (epoxy resin) serving as a third heat transfer medium from the heat generation or heat absorbing source of reaction container temperature adjustment section 8 in such a manner that the temperature sensor is sealed in the plastic (epoxy resin), it is desirable that the third environmental temperature sensor be located in a location at a distance less than or equal to 6 [mm] from the heat generation or heat absorbing source of reaction container temperature adjustment section 8 to the third environmental temperature sensor. When the third environmental temperature sensor is installed via metal (industrial aluminum) serving as a third heat transfer medium from the heat generation or heat absorbing source of reaction container temperature adjustment section 8 in such a manner that the sensor comes into contact with metal (industrial aluminum), it is desirable that the third environmental temperature sensor be located in a location at a distance less than or equal to 147 [mm] from the heat generation or heat absorbing source of reaction container temperature adjustment section 8 to the third environmental temperature sensor.

In Table 1, the physical properties at 300 K are calculated as representatives. Desirably, physical parameters are switched in accordance with the presumable apparatus average internal temperature inside the apparatus. For example, when the presumable apparatus average internal temperature inside the apparatus is used at 330 K, it is desirable to use the physical parameters at 330 K. Accordingly, by calculating the thermal diffusion distance by using the physical parameters suitable for the presumable apparatus average internal temperature inside the apparatus, the responsivity of the third environmental temperature sensor to a change in apparatus internal temperature can be set more quickly than the sample analysis time. The stability of temperature control can be improved.

Further, the third environmental temperature sensor is desirably arranged at a position thermally separate from pipette tip temperature adjustment section 7. More specifically, the third environmental temperature sensor is desirably configured to be thermally separate from the heat generation or heat absorbing source of pipette tip temperature adjustment section 7 via a fourth heat transfer medium, to be included in the apparatus, and to have a path having length $L_4$ along which heat can be transferred to the sensor via the fourth heat transfer medium that transfers heat from the heat generation or heat absorbing source of pipette tip temperature adjustment section 7, where length $L_4$ is greater than or equal to thermal diffusion distance $L_{D4}$ represented by (Expression 8) below when $\alpha_4$ [mm²/s] denotes the thermal diffusivity of the fourth heat transfer medium, $\lambda_4$ [W/(m·K)] denotes the thermal conductivity of the fourth heat transfer medium, $C_{p4}$ [J/(kg·K)] denotes the specific heat of the fourth heat transfer medium at constant pressure, $\rho_4$ [kg/m³] denotes the density of the fourth heat transfer medium, and $t_{mes}$ [s] denotes the time required to analyze the sample.

[8]

$$L_{D4} = 2\sqrt{\alpha_4 \times \frac{t_{mes}}{10}}$$ (Expression 8)

$$\alpha_4 = \frac{\lambda_4}{\rho_4 C_{p4}}$$

$$L_4 \geq L_{D4}$$

It should be noted that in (Expression 8), the direction of the inequality is opposite to the direction of the inequality in (Expression 7). With this configuration, the influence of the temperature change caused by heat generated or absorbed by pipette tip temperature adjustment section 7 on the measured value of a fourth environmental temperature sensor can be sufficiently slower than the measurement time, the fourth environmental temperature sensor can be thermally separate from the heat generation or heat absorbing source of pipette tip temperature adjustment section 7, and reaction container temperature controllability can be improved by improving the measurement accuracy of the fourth environmental temperature sensor.

<5> Fifth Embodiment

This embodiment presents a control flow suitable for implementation of the present invention. In this embodiment, the control flow of analysis apparatus 1C (FIG. 7) described in Embodiment 3 will be described.

Temperature adjustment system 1C of this embodiment is a temperature adjustment system to be applied to analysis apparatus 1C that analyzes a sample by using pipette nozzle 52 and reaction container 3, and includes driving section 54 that raises and lowers pipette tip 51, pipette tip temperature adjustment section 7 that performs temperature control of pipette tip 51, environmental temperature sensor 10 that senses at least the environmental temperature inside analysis apparatus 1C, pump 53 for sucking a liquid into pipette tip 51 and discharging the liquid from pipette tip 51, and temperature control section 6a that sets in advance a temperature control target value of pipette tip temperature adjustment section 7 for use during sample analysis on the basis of the environmental temperature sensed by environmental temperature sensor 10. In analysis apparatus 1C, during sample analysis, pipette tip 51 is lowered by driving section 54, and pump 53 performs a suction and discharge operation of repeatedly performing the suction and the discharge in a state where pipette tip temperature adjustment section 7 performs temperature adjustment on pipette tip 51; and a step for measurement includes, in sequence, an initial temperature adjustment step of setting the temperature control target value of pipette temperature adjustment section 7 to an initial temperature, a reagent information read step, a temperature-adjustment target value calculation step of calculating the temperature-adjustment target value on the basis of reagent information and information on environmental temperature sensor 10, a temperature control target value changing step of changing the temperature control target value to a temperature calculated in the temperature-adjustment target value calculation step, a first temperature adjustment step of starting temperature adjustment on the basis of the changed temperature control target value, a step of analyzing a sample, and an initial temperature-adjustment recovery step of setting the temperature control target value to the initial temperature after sample analysis, whereby the temperature control target value of pipette tip temperature adjustment section 7 for use during the sample analysis is changed (set) in advance on the basis of the measured value of environmental temperature sensor 10 before the sample analysis and analytical reagent information.

With this configuration, it is possible to control the reaction temperature in a sample analysis step in accordance with the type of the reagent or the environmental temperatures inside and outside the apparatus. As a result, temperature control stability in the sample analysis step can be improved, and the analysis error can be reduced.

Figure 8:
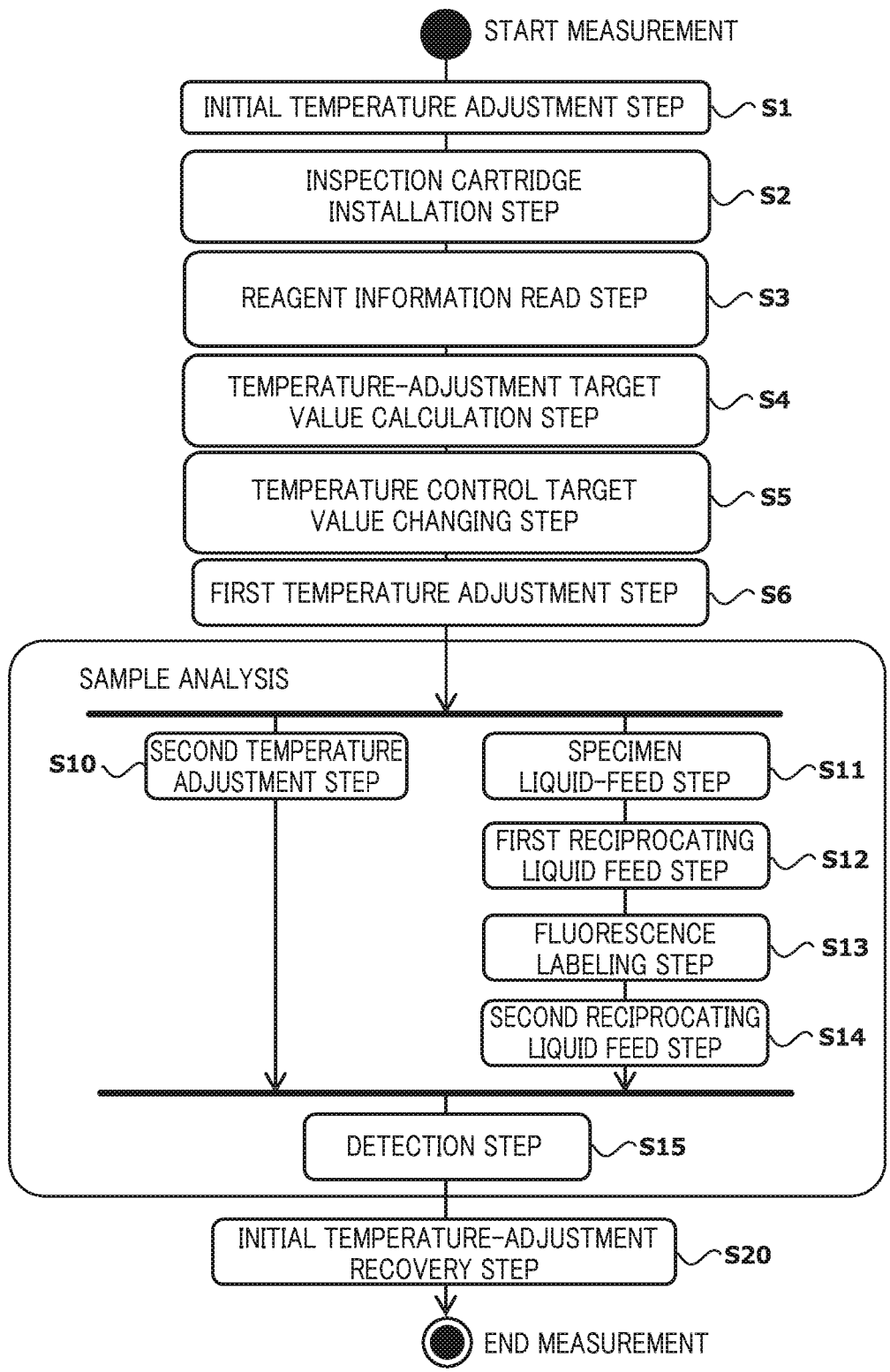
FIG. 8 is a flowchart illustrating a control flow according to a fifth embodiment.

The following describes a control flow according to this embodiment in detail with reference to FIG. 7 and FIG. 8.

Here, it is desirable that the present invention be applied to immunoassays, which are suitable for use in the detection of small substances. An immunoassay is a method for determining the presence or amount of a measurement target substance by using an antigen-antibody reaction between an antigen that is a measurement target substance contained in a sample liquid and an antigen labeled with a labeling substance.

The immunoassays include enzyme immunoassay (EIA) in which an enzyme is used as the labeling substance, and fluorescence immunoassay (FIA) in which a fluorescent substance is used as the labeling substance. Examples of a specimen detection device using a fluorescence immunoassay include a surface plasmon resonance device (SPR device) configured to apply a phenomenon (surface plasmon resonance, SPR) in which electrons and light resonate in a minute region of a nanometer level to obtain a high light output to detect, for example, a minute analyte in a living body. Due to the refractive index temperature dependence of the optical prism for measurement, the SPR device is a measurement method that is expected to have an effect of reducing temperature variations in measurement results.

Further, due to the temperature dependence of reactivity, a surface plasmon excitation enhanced fluorescence spectrometer device (SPFS device), which is configured to be capable of detecting an analyte more accurately than an SPR device on the basis of the principle of surface plasmon excitation enhanced fluorescence spectroscopy (SPFS: Surface Plasmon-field Fluorescence Spectroscopy) as an application of the surface plasmon resonance (SPR) phenomenon, may be used as an immunoassay capable of further improving reaction stability.

Surface plasmon excitation enhanced fluorescence spectroscopy (SPFS) generates surface plasmon light (the quantum state of a compression wave in which electrons and photons are coupled) on a surface of a metal film under the condition of the attenuated total reflectance (ATR) of excitation light, such as laser light emitted from a light source, on the surface of the metal film, thereby increasing the number of photons in the excitation light emitted from the light source by a factor of several tens to several hundreds to obtain the electric field enhancement effect of the surface plasmon.

In such an SPFS device, a sensor chip is used that includes a dielectric member, a metal film adjoining an upper surface of the dielectric member, and a liquid holding member arranged on an upper surface of the metal film. The sensor chip has, on the metal film, a reaction section having a ligand for capturing an analyte. A sample liquid containing the analyte is supplied to the liquid holding member. Accordingly, the analyte is captured by the ligand (primary reaction). In this state, a liquid (labeling liquid) containing a secondary antibody labeled with a fluorescent substance is introduced into the liquid holding member. In the liquid holding member, the analyte captured by the ligand is labeled with a fluorescent substance by an antigen-antibody reaction (secondary reaction).

In this state, when the metal film is irradiated with excitation light through the dielectric member at an angle at which surface plasmon resonance occurs, the fluorescent substance is excited by the surface plasmon light generated on the surface of the metal film, and fluorescence is generated from the fluorescent substance. By detecting the fluorescence, the presence or amount of the analyte can be measured.

The reactivity of an immune reaction such as a primary reaction or a secondary reaction generally changes depending on the temperature of the reaction field. The specimen inspection using the SPFS device is typically performed with the SPFS device installed at room temperature. In terms of promotion of the immune reaction and stabilization of the reaction efficiency, the reaction field is required to be controlled to a predetermined temperature. By applying the present invention to the SPFS device, the temperature controllability of the reaction field can be improved, and the stability of the analysis accuracy of the SPFS device can be improved.

A description will be given of a more desirable configuration when the present invention is applied to an analysis apparatus that includes an SPFS device and that uses an immune reaction and fluorescence analysis. When the present invention is applied to an analysis apparatus that uses fluorescence analysis, desirably, the step of analyzing the sample sequentially includes a specimen liquid-feed step, a first reciprocating liquid feed step, a fluorescence labeling step, and a second reciprocating liquid feed step, a second temperature adjustment step (S10 of FIG. 8) of controlling the temperature of pipette tip temperature adjustment section 7 that performs temperature control of pipette tip 51 by using the method of the present invention is included during the step, and the temperature control target value is kept constant in the second temperature adjustment step.

With the use of the configuration described above, in an analysis apparatus that includes an SPFS device and that uses fluorescence analysis, it is possible to improve the temperature stability of the reactivity of an immune reaction such as a primary reaction or a secondary reaction. In addition, the influence of deterioration of the stability of optical measurement due to the thermal expansion of an optical member can be suppressed, and measurement stability during fluorescence measurement can be improved.

Next, the control flow according to this embodiment will be described in detail with reference to FIG. 8.

1. Initial Temperature Adjustment Step (S1)

When the apparatus is not performing analysis, an initial temperature adjustment step (S1) continues. In the initial temperature adjustment step (S1), the temperature control target value of pipette tip temperature adjustment section 7 is continuously set to the initial temperature. When the present invention is applied to an analysis apparatus that includes an SPFS device and that uses an immune reaction and fluorescence analysis, in particular, it is desirable to set the initial temperature to a temperature near a body temperature of a person within their normal range. More specifically, the initial temperature is desirably set to 37° C.±2.0° C., more desirably to 37° C.±1.0° C., and still more desirably to 37° C.±0.5° C. With this configuration, the initial temperature can be set to a temperature near the temperature optimum to cause an immune reaction.

When reaction container temperature adjustment section 8 that controls the temperature of reaction container 3 is included in addition to pipette tip temperature adjustment section 7, the control target temperature of reaction container temperature adjustment section 8 is desirably set to be lower than the set temperature of pipette tip temperature adjustment section 7. With this setting, the disturbance provided to pipette tip temperature adjustment section 7 by reaction container temperature adjustment section 8 can be suppressed, and the control stability of the reaction temperature can be improved.

The control target value in the initial temperature adjustment step (S1) is desirably updated on the basis of the measured value of environmental temperature sensor 10 that senses at least the temperature inside the analysis apparatus (and further the temperature outside the analysis apparatus), and the timing of the update is desirably immediately after sample analysis. With this configuration, when the environmental temperatures inside and outside the apparatus change, the influence of the change in the temperatures inside and outside the apparatus on the reaction container temperature can be suppressed.

In a case where the time period during which the analysis apparatus is not performing analysis continues, the control target value is desirably updated at intervals of the measurement time. With this control, the influence of the change in the temperatures inside and outside the apparatus on the reaction container temperature can be suppressed even in the standby state in which no measurement is performed. In addition, the problem of unstable temperature control caused by a change in control target value within a shorter time than the measurement time can be suppressed, and temperature stability can be improved.

The temperature control system desirably includes a PID control system. In this case, the time constant of the integral component is desirably greater than or equal to $t_{mes}/100$ when $t_{mes}$ [s] denotes the time required to analyze the sample. With this configuration, the effect of the fluctuation of the temperature control system at a high rate relative to the measurement time can be suppressed, and temperature stability can be improved.

When the temperature control system is a digital control system, it is desirable to add an analog low-pass filter before the conversion of an analog value of a temperature sensor to a digital value, and the low-pass filter desirably has a cutoff frequency less than or equal to $100/t_{mes}$. With this configuration, the limit cycle, which is a phenomenon in which the digital control system oscillates and becomes unstable, can be suppressed, and the stability of temperature control can be improved.

In a PID digital control system, desirably, the time constant of the integral component is greater than or equal to $t_{mes}/100$, an analog low-pass filter is present before the conversion of an analog value of a temperature sensor to a digital value, the low-pass filter has a cutoff frequency less than or equal to $100/t_{mes}$, and the parameters of the control system are set so as not to cause an excessive amount of step response. With this configuration, it is possible to suppress the problem that the temperature control system becomes unstable due to the sensitive reaction of the temperature control system to disturbances of frequencies faster than the measurement time, and the temperature control stability within the measurement time can be improved.

When reaction container temperature adjustment section 8 that controls the temperature of reaction container 3 is included in addition to pipette tip temperature adjustment section 7, the relationship between a desirable temperature control target value and environmental temperature sensor 10 will be described hereinafter.

First, when at least one environmental temperature sensor 10 is included in the analysis apparatus and has a path having length L along which heat can be transferred to the sensor via a heat transfer medium that transfers heat from the exterior of the apparatus, where length L is less than or equal to thermal diffusion distance $L_D$ expressed by (Expression 1) above when $\alpha$ [mm$^2$/s] denotes the thermal diffusivity of the heat transfer medium, $\lambda$ [W/(m·K)] denotes the thermal conductivity of the heat transfer medium, Cp [J/(kg·K)] denotes the specific heat of the heat transfer medium at constant pressure, $\rho$ [kg/m$^3$] denotes the density of the heat transfer medium, and $t_{mes}$ [s] denotes the time required to analyze the sample, it is desirable to set the temperature control target value by using a temperature control table shown in Table 2. Here, the measured value of environmental temperature sensor 10 is used as the apparatus internal average temperature.

With this control, the reaction temperature can be controlled to be constant even when the external environmental temperature changes, and suppressing the change in the measured value of the analysis apparatus in response to the external temperature change contributes to the increased accuracy of the measured value.

TABLE 2

| Apparatus internal average temperature (environmental-temperature-sensor measured value) Tint [° C.] | | Apparatus external average temperature Tenv [° C.] | | Control target temperature of pipette tip temperature adjustment section $T_{PCH}$ [° C.] |
|---|---|---|---|---|
| Range [° C.] | Representative value [° C.] | Range [° C.] | Representative value [° C.] | Target value [° C.] |
| Less than 15.8° C. | 15.8 | Less than 10° C. | 10 | 40.0 |
| Greater than or equal to 15.8° C. and less than 20.8° C. | 15.8 | Greater than or equal to 10° C. and less than 15° C. | 10 | 40.0 |
| Greater than or equal to 20.8° C. and less than 25.8° C. | 20.8 | Greater than or equal to 15° C. and less than 20° C. | 15 | 39.0 |
| Greater than or equal to 25.8° C. and less than 30.8° C. | 25.8 | Greater than or equal to 20° C. and less than 25° C. | 20 | 38.5 |
| Greater than or equal to 30.8° C. and less than 35.8° C. | 30.8 | Greater than or equal to 25° C. and less than 30° C. | 25 | 38.0 |
| Greater than or equal to 35.8° C. and less than 40.8° C. | 35.8 | Greater than or equal to 30° C. and less than 35° C. | 30 | 37.0 |
| Greater than or equal to 40.8° C. | 35.8 | Greater than or equal to 35° C. | 30 | 37.0 |

The following describes a method for determining the temperature control table shown in Table 2.

It is preferable to calculate the lower limit $T_{set\_min}$ [° C.] of the temperature control target value in accordance with (Expression 9) by using the maximum temperature $T_{env\_max}$ [° C.] of the external environment where the apparatus is used, analysis apparatus power consumption P [W], and total ventilation volumetric airflow rate V [m³/s] of air conditioning fan 93 (FIG. 1, FIG. 6, and FIG. 7) of the apparatus for allowing the apparatus to exchange heat with the external environment. Here, $T_{int\_max}$ [° C.] denotes the maximum value of the average temperature inside the analysis apparatus. Further, $T_{offset}$ [° C.] denotes the margin width allowed for temperature control and is desirably set to greater than or equal to 1 [° C.], more desirably to greater than or equal to 2 [° C.], and still more desirably to greater than or equal to 10 [° C.]. Further, $\rho_{Air}$ [kg/m3] denotes the density of air, and $C_{p\_Air}$ [J/(kg·K)] denotes the specific heat of air at constant pressure. (Expression 9) is derived according to the law of conservation of energy inside the apparatus based on heat generation and ventilation.

[9]

$$T_{int\_max} = T_{env\_max} + \frac{P}{\rho_{Air} C_{p\_Air} V} \quad \text{(Expression 9)}$$

$$T_{set\_min} = T_{int\_max} + T_{offset}$$

For example, when analysis apparatus 1C has a total apparatus fan area of 16 [cm²] and every fan has an air velocity of 10 [m/s], volumetric airflow rate V=0.016 [m³/s], and $T_{set\_min}$=37.0 [° C.] is calculated as a result of calculation using the physical constant of air shown in Table 1. Here, it was assumed that $T_{env\_max}$=30° C., $T_{offset}$=1.2° C., and analysis apparatus power consumption P=110 [W].

On the other hand, assuming that the minimum temperature of the external environment where the analysis apparatus is used is denoted by $T_{env\_min}$ [° C.], the apparatus internal average temperature in the low temperature environment is given by

[10]

$$T_{int\_min} = T_{env\_min} + \frac{P}{\rho_{Air} C_{p\_Air} V}. \quad \text{(Expression 10)}$$

For example, when analysis apparatus 1C has a total apparatus fan area of 16 [cm²] and every fan has an air velocity of 10 [m/s], volumetric airflow rate V=0.016 [m³/s] is obtained, and $T_{int\_min}$=15.8 [° C.] is calculated as a result of calculation using the physical constant of air shown in Table 1. Here, analysis apparatus power consumption was assumed to be P=110 [W].

Further, in analysis apparatus 1C, the first partial differential coefficient (temperature coefficient [° C./° C.]) for the set temperature of pipette tip temperature adjustment section 7 relative to the reaction field temperature in the detection step (S15) is denoted by $A_{PCH}$, and the first partial differential coefficient (temperature coefficient [° C./° C.]) for the internal environmental temperature relative to the reaction field temperature in the detection step (S15) is denoted by $A_{env}$.

In this case, the condition for eliminating the difference in reaction field temperature in the detection step in analysis apparatus 1C between the maximum temperature of the external environment where the apparatus is used and the minimum temperature of the external environment where the apparatus is used is given by

[11]

$$\Delta T = \left[ \left( T_{env\_max} + \frac{P}{\rho_{Air} C_{p\_Air}} \right) - \left( T_{env\_min} + \frac{P}{\rho_{Air} C_{p\_Air}} \right) \right] \quad \text{(Expression 11)}$$

$$A_{env} + \Delta T_{PCH} A_{PCH} = 0.$$

Here, $\Delta T_{PCH}$ is a value obtained by subtracting the pipette control target value in the low temperature environment from the pipette tip control target value in the high temperature environment. By modifying (Expression 11),

[12]

$$\Delta T_{PCH} = -(T_{env\_max} - T_{env\_min}) \times \frac{A_{env}}{A_{PCH}} \quad \text{(Expression 12)}$$

is calculated.

For example, if $T_{env\_max}$=30° C., $T_{env\_min}$=10° C., $A_{env}$=0.06, and $A_{PCH}$=0.40, $$\Delta T_{PCH} = -(30-10) \times 0.06/0.40 = -3.0[° C.]$$

is calculated. That is, the set temperature of pipette tip temperature adjustment section 7 in the low temperature environment is preferably increased by 3° C., compared with that in the high temperature environment.

When the external environmental temperature is in the range from $T_{env\_min}$ to $T_{env\_max}$, the target temperature provided to the pipette tip temperature adjustment section 7 is preferably changed along a straight line, taking into account that (Expression 11) is linear. In consideration of this, the set temperatures in Table 2 are calculated. More specifically, if the apparatus external environmental temperature is denoted by $T_{env}$, and the apparatus internal average temperature calculated by the measured value of environmental temperature sensor 10 is denoted by $T_{int}$, the set temperature of pipette tip temperature adjustment section 7 is desirably determined in accordance with

[13]

$$T_{PCH} = T_{PCH\_max} + (T_{env\_max} - T_{env}) \times \frac{A_{env}}{A_{PCH}} \quad \text{(Expression 13)}$$

$$T_{env} = T_{int} - \frac{P}{\rho_{Air} C_{p\_Air} V}.$$

As found from (Expression 12), it is possible to estimate the temperature outside the apparatus by using the apparatus internal average temperature. In addition, environmental temperature sensor 10 is configured to easily sense the temperature outside the apparatus, thereby improving the estimation accuracy of (Expression 12). The controllability of the reaction field temperature can be improved.

The temperature control table shown in Table 2 shows values calculated using (Expression 13) above, with values less than 0.5 being normalized according to a step width of 0.5. For example, 39.25° C. is rounded down to 39.0° C., and 37.75° C. is rounded down to 37.5° C. In this way, adjusting the values according to the 0.5° C. width can prevent an input error in the temperature control table and can reduce the number of bits of data when the digital control system is used. As a result, the advantage of a reduction in the computer memory capacity required for control is achieved and contributes to stable temperature control.

In this way, in a method for recording the temperature control target value in the apparatus, it is desirable that the temperature be normalized by a value obtained by multiplying or dividing 1° C. by a power of 2, such as {2° C., 1° C., 0.5° C., 0.25° C., 0.125° C.} as a unit of temperature. The recording in this way facilitates consistency with binary for the digital control system, and the advantage of a reduction in the computer memory capacity required for control is achieved and contributes to stable temperature control.

When external environmental temperature Tenv out of the apparatus specification is estimated from environmental-temperature-sensor measured value Tint, for example, as shown in Table 2, the target temperature is preferably set to a control target temperature in accordance with the lower limit and the upper limit of the apparatus specification, and control section 6 is preferably configured to be notified of a temperature error. With this configuration, temperature adjustment of pipette tip temperature adjustment section 7 is prevented at high or low temperatures out of expected specifications, and, if the apparatus is used in an external environmental temperature out of expected specifications, a warning is provided to a measurement operator to provide the measurement operator with information relating to the reliability of the apparatus's measured value.

2. Inspection Cartridge Installation Step (S2)

In an inspection cartridge installation step (S2), inspection cartridge 2 is installed on stage 4 by a measurement operator or an automatic inspection cartridge installation mechanism.

In implementation of the present invention, it is desirable that inspection cartridge 2 be configured to have the same temperature as that of the apparatus external environment before measurement. With this configuration, it is possible to estimate the inspection cartridge temperature by using the measured value of environmental temperature sensor 10, and it is possible to set the temperature control target values of pipette tip temperature adjustment section 7 and reaction container temperature adjustment section 8 in advance before the sample analysis to control the reaction field temperature by using the measured value of environmental temperature sensor 10.

3. Analytical Reagent Information Read Step (S3)

Inspection cartridge 2 includes analytical reagent information (not illustrated). The analytical reagent information is constituted by, for example, a character string, a one-dimensional barcode, a two-dimensional barcode, a semi-conductor memory, a hologram film, or the like. The analytical reagent information, which is constituted by a character string, has an advantage that it is easily recognizable to a person. The analytical reagent information, which is constituted by a one-dimensional barcode or a two-dimensional barcode, has an advantage that it is inexpensive and excellent in mass production performance and provides a large amount of information. The analytical reagent information, which is constituted by a semiconductor memory or a hologram film, has an advantage that it provides a large amount of information. In particular, it is desirable that the reagent information include both character string information, which is easily recognizable to a person, and a two-dimensional barcode, which is easily recognizable by an apparatus. With this configuration, the apparatus can stably obtain the analytical reagent information, and a person who performs analysis can be prevented from analyzing a wrong reagent cartridge.

The analytical reagent information includes information on the type of the reagent and is configured to be compared with information such as the temperature dependence of the reaction of the reagent accumulated in the apparatus. It is also desirable that the analytical reagent information itself incorporate the type of the reagent and the temperature dependence of reaction, for example, the temperature dependence of the reaction rate constant. This realizes a reaction system capable of flexible temperature control for various reagents.

Further, the analytical reagent information desirably includes $A_{PCH}$ and $A_{env}$ included in (Expression 11) and (Expression 12), where $A_{PCH}$ denotes the first partial differential coefficient (temperature coefficient [° C./° C.]) for the set temperature of pipette tip temperature adjustment section 7 relative to the reaction field temperature in the detection step (S15) in analysis apparatus 1C, and $A_{env}$ denotes the first partial differential coefficient (temperature coefficient [° C./° C.]) for the internal environmental temperature relative to the reaction field temperature in the detection step (S15). With this configuration, the reaction field temperature in the detection step (S15) can be controlled with high accuracy by using the environmental temperature measured by environmental temperature sensor 10.

When information relating to the analytical reagent information is stored as a reagent identifying symbol such as a reagent number, the apparatus is desirably configured to be capable of acquiring additional analytical reagent information of the analytical reagent via an information network such as the Internet, and is desirably configured to be capable of obtaining $A_{PCH}$ and $A_{env}$ as additional analytical reagent information via an information network, where $A_{PCH}$ denotes first partial differential coefficient (temperature coefficient [° C./° C.]) for the set temperature of pipette tip temperature adjustment section 7 relative to the reaction field temperature in the detection step (S15) in analysis apparatus 1C, and $A_{env}$ denotes the first partial differential coefficient (temperature coefficient [° C./° C.]) for the internal environmental temperature relative to the reaction field temperature in the detection step (S15). With this configuration, it is possible to control the reaction field temperature in the detection step (S15) with high accuracy by using the environmental temperature measured by environmental temperature sensor 10.

Likewise, the apparatus is configured to store, in advance, the reagent identifying symbol, the first partial differential coefficient (temperature coefficient [° C./° C.]) for the set temperature of pipette tip temperature adjustment section 7 relative to the reaction field temperature in the detection step (S15), which is denoted by $A_{PCH}$, and the first partial differential coefficient (temperature coefficient [° C./° C.]) for the internal environmental temperature relative to the reaction field temperature in the detection step (S15), which is denoted by $A_{env}$, as an additional analytical reagent, thereby achieving similar effects. With this configuration, it is possible to control the reaction field temperature in the detection step (S15) with high accuracy by using the environmental temperature measured by environmental temperature sensor 10.

The reagent identifying symbol and the first partial differential coefficients (temperature coefficients) are not limited to the information described here, and the apparatus is desirably configured to be capable of obtaining and storing a multidimensional temperature coefficient using control target values of a plurality of environmental temperature sensors and a plurality of temperature adjustment sections as input and reaction field temperatures in a plurality of reaction steps as output. With this configuration, the plurality of temperature adjustment sections are controlled on the basis of the measured values of the plurality of environmental temperature sensors and reagent information, thereby making the plurality of reaction steps controllable with high accuracy.

4. Temperature-Adjustment Target Value Calculation Step (S4)

In the temperature-adjustment target value calculation step (S4), the temperature-adjustment target value is calculated on the basis of reagent information and information on environmental temperature sensor 10.

In the temperature adjustment target value calculation step (S4), the temperature target value of pipette tip temperature adjustment section 7 is calculated before analysis on the basis of analytical reagent information and environmental temperature sensor 10 that senses at least the internal temperature (and may also sense the external temperature) of one or more analysis apparatuses. The temperature target value is desirably a control target value shown in Table 2 or (Expression 13) in "1. Initial Temperature Adjustment Step (S1)". Through the calculation in this manner, it is possible to control the reaction field temperature in the detection step (S15) with high accuracy, regardless of the external environmental temperature.

5. Temperature Control Target Value Changing Step (S5)

In the temperature control target value changing step (S5), the temperature control target value is changed to the temperature calculated in temperature-adjustment target value calculation step (S4).

6. First Temperature Adjustment Step (S6)

In the first temperature adjustment step (S6), temperature adjustment is started on the basis of the changed temperature control target value.

7. Step of Analyzing Sample (S10 to S15)

In the step of analyzing the sample (S10 to S15), after a reaction is carried out within reaction container 3 by using an analytical sample contained in inspection cartridge 2 and an analytical reagent contained in inspection cartridge 2, detection is performed, and an output signal is measured to analyze a sample. More specifically, it is desirable to apply the present invention to immunoassays, which are suitable for use in the detection of small substances. An immunoassay is a method for determining the presence or amount of a measurement target substance by using an antigen-antibody reaction between an antigen that is a measurement target substance contained in a sample liquid and an antigen labeled with a labeling substance.

8. Initial Temperature-Adjustment Recovery Step (S20)

The initial temperature-adjustment recovery step (S20) is a step of setting the temperature control target value to the initial temperature after sample analysis. More specifically, it is desirable to use the same step as "1. Initial Temperature Adjustment Step (S1)". With this configuration, even after measurement is repeatedly performed, the temperature control target value of a temperature adjustment section within the apparatus is set to the same value before the measurement, and the apparatus internal temperature environment can be stabilized.

<6> Sixth Embodiment

This embodiment presents a desirable configuration when reaction container temperature adjustment section 8 that controls the temperature of reaction container 3 is included. A specific description will be made hereinafter with reference to FIG. 6 and FIG. 7.

A temperature adjustment system of this embodiment is a temperature adjustment system to be applied to an analysis apparatus that analyzes a sample by using pipette tip 51 and reaction container 3, and includes driving section 54 that raises and lowers pipette tip 51, pipette tip temperature adjustment section 7 that performs temperature adjustment of pipette tip 51, environmental temperature sensor 10 that senses at least the environmental temperature inside the analysis apparatus (and may also sense the environmental temperature outside the analysis apparatus), and pump 53 for sucking a liquid into pipette tip 51 and discharging the liquid from pipette tip 51. In the temperature adjustment system of this embodiment, during sample analysis, pipette tip 51 is lowered by driving section 54, and pump 53 performs a suction and discharge operation of repeatedly performing the suction and the discharge in a state where pipette tip temperature adjustment section 7 performs temperature adjustment on pipette tip 51; and the temperature control target value of pipette tip temperature adjustment section 7 for use during the sample analysis is changed (set) in advance on the basis of the measured value of environmental temperature sensor 10 before the sample analysis and analytical reagent information. The temperature adjustment system of this embodiment further includes reaction container temperature adjustment section 8 that controls the temperature of reaction container 3, and the control target temperature of reaction container temperature adjustment section 8 is set to be lower than the set temperature of pipette tip temperature adjustment section 7.

With this configuration, it is possible to control a reaction temperature to a target temperature within a desired reaction time, and adjusting control in advance based on the analytical reagent information can improve control stability. In addition, the disturbance provided to pipette tip temperature adjustment section 7 by reaction container temperature adjustment section 8 can be suppressed, and the control stability of the reaction temperature can be improved.

The following describes this embodiment in more detail.

The control target temperature of pipette tip temperature adjustment section 7 is desirably controlled by using the control target value described in the fifth embodiment.

The control target temperature of reaction container temperature adjustment section 8 is desirably the minimum value of the control target temperature of pipette tip temperature adjustment section 7 in the apparatus-use environment among the values of the control target temperature of pipette tip temperature adjustment section 7 described in the fifth embodiment.

A preferred specific example of a temperature control table when reaction container temperature adjustment section 8 is included is shown in Table 3. In this way, the control target values of reaction container temperature adjustment section 8 in all the environments are constant and are set to the minimum value of the control target temperature of pipette tip temperature adjustment section 7.

TABLE 31

| Apparatus internal average temperature (environmental-temperature-sensor measured value) Tint [° C.] | | Apparatus external average temperature Tenv [° C.] | | Control target temperature of pipette tip temperature adjustment section $T_{PCH}$ [° C.] Target value [° C.] | Control target temperature of reaction container temperature adjustment section $T_{stage}$ [° C.] Target value [° C.] |
|---|---|---|---|---|---|
| Range [° C.] | Representative value [° C.] | Range [° C.] | Representative value [° C.] | | |
| Less than 15.8° C. | 15.8 | Less than 10° C. | 10 | 40.0 | 37.0 |
| Greater than or equal to 15.8° C. and less than 20.8° C. | 15.8 | Greater than or equal to 10° C. and less than 15° C. | 10 | 40.0 | 37.0 |
| Greater than or equal to 20.8° C. and less than 25.8° C. | 20.8 | Greater than or equal to 15° C. and less than 20° C. | 15 | 39.0 | 37.0 |
| Greater than or equal to 25.8° C. and less than 30.8° C. | 25.8 | Greater than or equal to 20° C. and less than 25° C. | 20 | 38.5 | 37.0 |
| Greater than or equal to 30.8° C. and less than 35.8° C. | 30.8 | Greater than or equal to 25° C. and less than 30° C. | 25 | 38.0 | 37.0 |
| Greater than or equal to 35.8° C. and less than 40.8° C. | 35.8 | Greater than or equal to 30° C. and less than 35° C. | 30 | 37.0 | 37.0 |
| Greater than or equal to 40.8° C. | 35.8 | Greater than or equal to 35° C. | 30 | 37.0 | 37.0 |

Assuming that the control target temperature of reaction container temperature adjustment section 8 is set to be higher than the set temperature of pipette tip temperature adjustment section 7, the air heated by stage temperature-adjustment heater 81 needs to be cooled by pipette tip temperature adjustment section 7 using a cooling mechanism. Pipette tip temperature adjustment section 7, when including a heat pipe or a heat radiation structure for cooling, increases in complexity or size, causing a problem in that manufacturing cost or variation increases.

In contrast, as in this embodiment, assuming that the control target temperature of reaction container temperature adjustment section 8 is set to be lower than the set temperature of pipette tip temperature adjustment section 7, the structure of pipette tip temperature adjustment section 7 can be constituted only by a heating source with a heater, thereby achieving the advantages of a simplified configuration of pipette tip temperature adjustment section 7, a reduction in the number of components used, and a reduction in the manufacturing cost and manufacturing variation. In addition, the air heated once by stage temperature-adjustment heater 81 does not need to be cooled by pipette tip temperature adjustment section 7, thereby achieving the advantages of a reduction in the total power consumption of pipette tip temperature adjustment section 7 and reaction container temperature adjustment section 8 and an improvement in control stability.

Further, the temperature control table is desirably controlled so as to, instead of changing the pipette tip temperature control target value for all of the temperature regions, increase the pipette tip temperature control target value on the basis of a typical apparatus external average temperature (for example, 23° C.) only when the apparatus external average temperature is lower than the typical apparatus external average temperature typical, and, desirably, the temperature control gradient is more strongly corrected than that for previously calculated target values. With the setting of the target value described above, it is possible to control the reaction field temperature to have a quadratic curvature example shown in Table 2, achieving more stable temperature control. In addition, to apply stronger control in the low temperature environment, the control temperature is further increased by multiplying it by a constant safety factor. Here, the control temperature is assumed to be multiplied by a safety factor of 1.5 to control the control temperature to a higher value, i.e., 3×1.5=4.5° C.

Further, the typical apparatus external average temperature is set to 23° C., and if the apparatus external average temperature calculated by an environmental temperature sensor disposed within the apparatus exceeds the typical apparatus external average temperature, the temperature-adjustment temperature of a pipette tip heater is maintained at $T_{set\_min}$ and is not changed. As a result, a control table shown in Table 4 is obtained.

TABLE 4

| Apparatus internal average temperature (environmental-temperature-sensor measured value) Tint [° C.] | | Apparatus external average temperature Tenv [° C.] | | Control target temperature of pipette tip temperature adjustment section $T_{PCH}$ [° C.] | Control target temperature of reaction container temperature adjustment section $T_{stage}$ [° C.] |
|---|---|---|---|---|---|
| Range [° C.] | Representative value [° C.] | Range [° C.] | Representative value [° C.] | Target value [° C.] | Target value [° C.] |
| Less than 15° C. | 12.5 | Less than 10° C. | 7.5 | 41.5 | 37.0 |
| Greater than or equal to 15° C. and less than 20° C. | 17.5 | Greater than or equal to 10° C. and less than 15° C. | 12.5 | 40.0 | 37.0 |
| Greater than or equal to 20° C. and less than 25° C. | 22.5 | Greater than or equal to 15° C. and less than 20° C. | 17.5 | 38.5 | 37.0 |
| Greater than or equal to 25° C. and less than 30° C. | 27.5 | Greater than or equal to 20° C. and less than 25° C. | 22.5 | 37.0 | 37.0 |
| Greater than or equal to 30° C. and less than 35° C. | 32.5 | Greater than or equal to 25° C. and less than 30° C. | 27.5 | 37.0 | 37.0 |
| Greater than or equal to 35° C. | 37.5 | Greater than or equal to 30° C. | 32.5 | 37.0 | 37.0 | on the basis of the typical apparatus external average temperature (for example, 23° C.), and the stability of temperature control can be improved.

A specific example is given using the following calculation. For example, when analysis apparatus 1C has a total apparatus fan area of 16 [cm²] and every fan has an air velocity of 10 [m/s], volumetric airflow rate V=0.016 [m³/s] is obtained, and $T_{set\_min}$=37.0 [° C.] is calculated as a result of calculation using the physical constant of air shown in Table 1. Here, it was assumed that $T_{env\_max}$=30° C., $T_{offset}$=2.0° C., and analysis apparatus power consumption P=95 [W]. When $T_{env\_max}$=30° C., $T_{env\_min}$=10° C., $A_{env}$=0.06, and $A_{PCH}$=0.40, $$\Delta T_{PCH} = -(30-10) \times 0.06/0.40 = -3.0 [° C.]$$

is calculated. That is, the set temperature of pipette tip temperature adjustment section 7 in the low temperature environment is preferably increased by 3° C., compared with that in the high temperature environment. Setting $T_{offset}$ to 2.0° C. can make the allowance for the apparatus internal temperature substantially twice as large as that in the With this control, the robustness of reaction field temperature control to the apparatus external average temperature can be improved. The safety factor to be used to apply stronger control is desirably greater than or equal to 1.1, and is desirably less than 2.0. More desirably, the safety factor is set to 1.5. Thus, setting can be made such that the quadratic curvature of the reaction field temperature can extend across the control target temperature, centered on the typical temperature, and the robustness of temperature control to a change in apparatus external temperature can be improved.

A method for discretely controlling the temperature by using a control table has been described. It is desirable to successively change the control target value with respect to the measured value of the environmental temperature sensor by using Expressions (1) to (13) described above and the concept of the safety coefficient. This can further improve the stability of temperature control at a control switching temperature in the control table.

<7> Seventh Embodiment

This embodiment presents a form of the relationship between the temperature characteristic of pipette tip temperature adjustment section 7 and a control method, which is suitable for implementation of the present invention.

Figure 9:
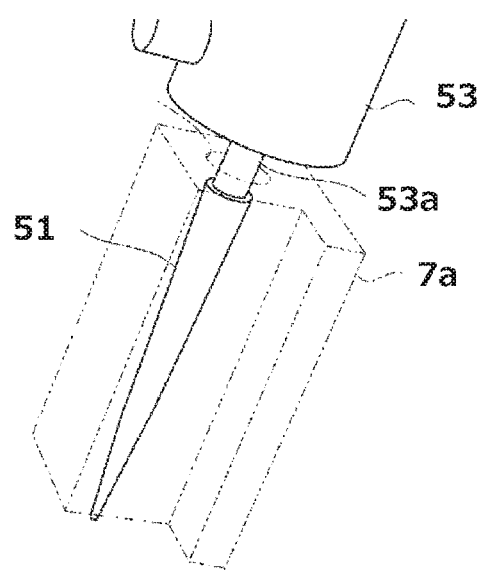
FIG. 9 is a perspective view illustrating a pipette tip temperature adjustment section constituted by a block heater according to a seventh embodiment.
Figure 10:
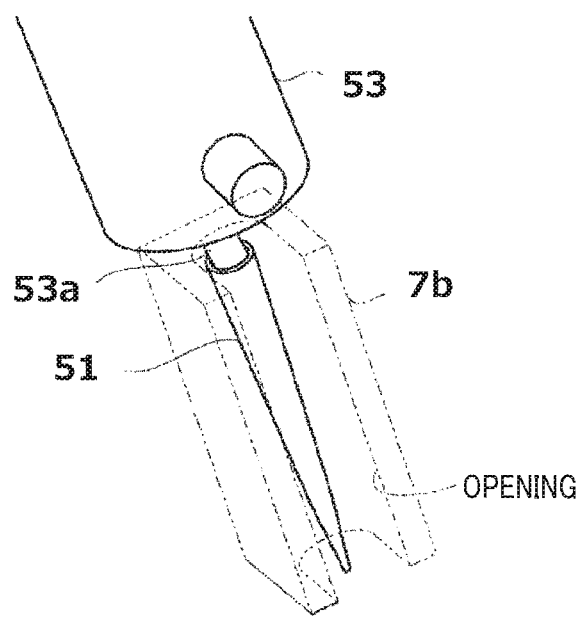
FIG. 10 is a perspective view illustrating a pipette tip temperature adjustment section constituted by a block heater according to the seventh embodiment.

1. Configuration of Pipette Tip Temperature Adjustment Section, Except for Air Feed In implementation of the present invention, as illustrated in FIG. 9 or FIG. 10, pipette tip temperature adjustment section 7 is desirably constituted by a block heater. With this configuration, the time taken for the temperature of pipette tip 51 to reach a steady value after a temperature target value is set can be shortened, and the effect of further enhancing the effects of the present invention is achieved.

The following describes the configurations illustrated in FIG. 9 and FIG. 10 in detail.

The pipette tip temperature adjustment section illustrated in FIG. 9 is configured such that pipette tip heat block 7a, which is a heat block that controls the temperature of pipette tip 51, has a through-hole through which pipette tip 51 is to be inserted. Pipette tip 51 is attached to pipette-tip attachment base 53a of pump 53. Further, pipette tip 51 is configured such that only a portion thereof for ejecting or sucking in a liquid to a liquid ejection/suction section of reaction container 3 is exposed from pipette tip heat block 7a.

When the length of the exposed tip section of pipette tip 51 is denoted by L1 and the spatial depth of the liquid ejection/suction section of reaction container 3 is denoted by L2, L1≥L$_2$ is configured to be met. Here, L1 and L$_2$ are desirably substantially the same length. With this configuration, maximizing the area of a portion where pipette tip heat block 7a and pipette tip 51 overlap while ensuring the performance of liquid feed with respect to reaction container 3 can minimize the thermal resistance between pipette tip heat block 7a and pipette tip 51. The temperature controllability of pipette tip temperature adjustment section 7 can be improved.

In the pipette tip temperature adjustment section illustrated in FIG. 10, pipette tip heat block 7b having a U-shaped cross section is disposed spaced apart from pipette tip 51 so as to surround pipette tip 51 in the length direction of pipette tip 51. In other words, pipette tip heat block 7b is shaped such that a sidewall of a cylindrical heat block having a rectangular cross section is cut away and open (have an opening). The other sections are similar to those in FIG. 9 and will not be described.

Here, in an analysis apparatus that analyzes a specimen such as blood as a sample, it is necessary to use a new pipette tip each time inspection is performed or to clean the pipette tip to prevent specimen contamination (contamination of the specimen). Accordingly, a single inspection requires the operation of attaching and detaching a pipette tip or the operation of moving a pipette tip from the heat block to a cleaning tank. The configuration illustrated in FIG. 10 has advantages of easy attachment and detachment of pipette tip 51 within the apparatus and easy movement of pipette tip 51, in addition to the advantages of the configuration illustrated in FIG. 9, and has an effect of improvement in workability, resulting in a reduction in the inspection time and an improvement in throughput.

In addition, the configuration illustrated in FIG. 10 enables the observation of the behavior of the liquid within pipette tip 51. For example, when pump 53 or the like fails, the occurrence of a problem can be quickly detected, and it is possible to know the possibility that a correct inspection result is not obtained due to a biological reaction caused by an inappropriate liquid feed.

2. Configuration and Member of Pipette Tip

The following describes a configuration of pipette tip 51 suitable for implementation of the present invention.

In implementation of the present invention, it is desirable that pipette tip 51 be constituted by a disposable resin pipette tip or a metal pipette tip available for multiple measurements.

When pipette tip 51 is constituted by a disposable resin pipette tip, specimen contamination (contamination of the specimen) can be prevented. In addition, since the specific heat of resin is higher than that of metal, the advantages of improving the performance of thermal insulation of the liquid in the pipette tip and improving the stability of reaction field temperature control are achieved. Table 5 shows example resin materials that can be used as a material of pipette tip 51 in the present invention.

TABLE 5

| | | | A: Particularly desirable B: Desirable C: Less suitable D: Unsuitable | | |
| Material name | Coefficient of thermal expansion [×10 − 5/K] | Susceptibility to weak acids | Transparency of visible light | Thermal expansion | Resistance to weak acids |
| --- | --- | --- | --- | --- | --- |
| Urea resin | 2.7 | Affected | B | A | D |
| Acrylonitrile-styrene (AS resin) | 2.9 | No | B | A | A |
| Melamine resin | 4 | No | C | A | A |
| Phenolic resin | 4.7 | No or minute changes | C | A | B |
| Polypropylene (PP) | 5 | No | B | A | A |
| Polytrifluoroethylene chloride (polychlorotrifluoroethylene) | 5 | No | D | A | A |
| Polysulfone | 5.4 | Slightly | C | B | C |
| Epoxy resin | 5.5 | No | B | B | A |
| Polycarbonate | 5.6 | No | B | B | A |
| Polymethyl methacrylate (acrylic resin, PMMA) | 5.8 | No | A | B | A |
| Polyethylene terephthalate | 6.5 | No | B | B | A |
| Unsaturated polyester resin | 7.5 | No | D | B | A |
| Polyamide 6 (nylon 6) | 8 | Strongly resistant | C | B | B |

TABLE 5-continued

|  | Coefficient of thermal expansion [×10 − 5/K] | Susceptibility to weak acids | A: Particularly desirable B: Desirable C: Less suitable D: Unsuitable | | |
| --- | --- | --- | --- | --- | --- |
| Material name |  |  | Transparency of visible light | Thermal expansion | Resistance to weak acids |
| Polyoxymethylene (polyacetal) | 8.3 | Resistant | C | B | C |
| Polyamide 66 (nylon 66) | 9 | Strongly resistant | C | B | B |
| Acrylonitrile-butadiene-styrene plastic (ABS resin) | 9.5 | No to slightly | C | B | B |
| Polyurethane resin | 15 | Slightly | B | C | C |
| Polyethylene | 19 | Resistant | B | C | B |

When pipette tip 51 is formed of a resin material, for example, polyolefins such as polyethylene (PE) or polypropylene (PP), polycyclic olefins such as cyclic olefin copolymer (COC) or cyclic olefin copolymer (COP), polystyrene, polycarbonate (PC), acrylic resin, triacetyl cellulose (TAC), or the like can be used.

The length of pipette tip 51 is changed by the set temperature of pipette tip temperature adjustment section 7 due to thermal expansion. On the other hand, there is a problem in that if the length is changed, the position of the tip is changed, thereby causing a change in contact area of the inside of reaction container 3 with the liquid, resulting in a change in the thermal resistance of reaction container 3 and pipette tip 51 and a change in the controllability of the reaction field temperature. In particular, acrylic resin (PMMA) has a low coefficient of linear expansion of 4.5 to 7×10$^{-5}$ [1K] and has high transparency. Combining acrylic resin (PMMA) with the present invention can improve the reaction field temperature characteristic, and enables the observation of the behavior of the liquid within pipette tip 51. For example, when pump 53 or the like fails, the occurrence of a problem can be quickly detected, and it is possible to know the possibility that a correct inspection result is not obtained due to a biological reaction caused by an inappropriate liquid feed.

In implementation of the present invention, it is desirable to use, as a material of pipette tip 51, a material having high transparency of visible light and low thermal expansivity and having properties that do not change according to the reagent (particularly, weak acid) used in the reaction during analysis. A material having high transparency of visible light refers to a material having a transmittance greater than or equal to 80%, more desirably, greater than or equal to 90%, and still more desirably, greater than or equal to 95% at a wavelength of 550 nm at which human visual sensitivity is the highest. Here, the transmittance is assumed to be measured with a plate-like sample having a thickness of 1 mm. A material having low thermal expansivity refers to a material having a coefficient of thermal expansion less than or equal to 10×10$^{-5}$, more desirably, less than or equal to 6×10$^{-5}$, and still more desirably, less than or equal to 5×10$^{-5}$. A material having properties that do not change according to the reagent (particularly, weak acid) used in the reaction during analysis means that the surface is not affected by weak acids or is affected to the extent that measurement results are not affected during the analysis time.

For example, among the resin materials shown in Table 5, polypropylene is suitable for transparency of visible light, thermal expansion, and resistance to weak acids, and pipette tip 51 formed of polypropylene is desirably used for implementation of the present invention. When this material is used for implementation of the present invention, there are advantages in that the stability of reagent analysis related to temperature control can be improved and the liquid feed state during analysis can be checked by visible light from the outside, and it is possible to know the possibility that a correct inspection result is not obtained due to a biological reaction caused by an inappropriate liquid feed.

When a metal pipette tip available for multiple measurements is fixed to the apparatus as pipette tip 51, since the specific heat of metal is lower than that of resin, the time taken for temperature stabilization is shortened, and the initial apparatus warm-up time can be shortened. In addition, temperature adjustment can be realized with a small amount of heat, achieving the advantage of the energy saving of the temperature adjustment system. When pipette tip 51 is constituted by a pipette tip available for multiple measurements, a single inspection requires the movement of pipette tip 51 from the heat block to the cleaning tank and the cleaning operation; however, the use of metal is advantageous as it can shorten the time taken for temperature stabilization when pipette tip 51 returns from the cleaning tank and can improve the stability of the reaction field temperature.

3. Temperature Characteristic of Pipette Tip

In implementation of the present invention, it is desirable that information relating to the temperature dependence of pipette tip 51 be stored in the apparatus. With this configuration, the target value of pipette tip temperature adjustment section 7 is changed in advance before sample analysis on the basis of information relating to the temperature dependence of pipette tip 51, reagent information, and the measured value of environmental temperature sensor 10, thereby achieving temperature stability during the sample analysis.

Examples of the information relating to the temperature dependence of pipette tip 51 include the temperature dependence of the thermal expansivity, the temperature dependence of the index of refraction, and the temperature dependence of the hydrodynamic properties (such as contact angle and wettability) of the surface. In particular, the hydrodynamic properties depend on the reagent. Thus, it is desirable to store a combination of reagent information and pipette tip information in the apparatus. To store a combination of reagent information and pipette tip information, it is desirable that the apparatus be configured to be capable of acquiring additional analytical reagent information of the analytical reagent via an information network such as the Internet. With this configuration, it is possible to acquire pipette tip information and reagent information corresponding to the reagent to be analyzed and the specimen, and stable reagent analysis is achieved. In particular, when the temperature dependence of the hydrodynamic properties (such as contact angle and wettability) of the surface is stored, the amount of reagent to be taken during the reagent reaction can be adjusted to be constant. Keeping the reactivity of the reaction step constant makes it possible to control reagent analysis so as not to cause variation even if the apparatus internal environmental temperature changes.

The target value of pipette tip temperature adjustment section 7 is changed in advance before sample analysis so that, during the sample analysis, the reaction field temperature in the detection step can be kept constant even if the apparatus internal environmental temperature changes, on the basis of information relating to the temperature dependence of pipette tip 51, reagent information, and the measured value of the environmental temperature sensor. Accordingly, the reaction field temperature can be controlled so as not to cause variation even if the apparatus internal environmental temperature changes.

<8> Eighth Embodiment

In this embodiment, the relationship between optical measurement and a preferred temperature control method in the present invention will be described.

A temperature adjustment system of this embodiment is a temperature adjustment system to be applied to an analysis apparatus that analyzes a sample by using pipette tip 51 and reaction container 3, and includes driving section 54 that raises and lowers pipette tip 51, pipette tip temperature adjustment section 7 that performs temperature adjustment of pipette tip 51, environmental temperature sensor 10 that senses at least the environmental temperature inside the analysis apparatus (and may also sense the environmental temperature outside the analysis apparatus), and pump 53 for sucking a liquid into pipette tip 51 and discharging the liquid from pipette tip 51.

In the temperature adjustment system of this embodiment, during sample analysis, pipette tip 51 is lowered by driving section 54, and pump 53 performs a suction and discharge operation of repeatedly performing the suction and the discharge in a state where pipette tip temperature adjustment section 7 performs temperature adjustment on pipette tip 51; and a step for measurement includes, in sequence, an initial temperature adjustment step of setting the temperature control target value of pipette temperature adjustment section 7 to an initial temperature, a reagent information read step, a temperature-adjustment target value calculation step of calculating the temperature-adjustment target value on the basis of reagent information and information on environmental temperature sensor 10, a temperature control target value changing step of changing the temperature control target value to a temperature calculated in the temperature-adjustment target value calculation step, a first temperature adjustment step of starting temperature adjustment on the basis of the changed temperature control target value, a step of analyzing a sample, and an initial temperature-adjustment recovery step of setting the temperature control target value to the initial temperature after sample analysis, whereby the temperature control target value of pipette tip temperature adjustment section 7 for use during the sample analysis is changed (set) in advance on the basis of the measured value of environmental temperature sensor 10 before the sample analysis and analytical reagent information.

In the temperature adjustment system of this embodiment, furthermore, the apparatus that analyzes the sample is an analysis apparatus that includes an SPFS device and that uses an immune reaction and fluorescence analysis; the step of analyzing the sample sequentially includes a specimen liquid-feed step, a first reciprocating liquid feed step, a fluorescence labeling step, and a second reciprocating liquid feed step; a second temperature adjustment step of performing, by pipette tip temperature adjustment section 7, temperature adjustment on pipette tip 51 by using the method provided in any of Embodiments 1 to 7 described above is included during the step; the temperature control target value is kept constant in the second temperature adjustment step; the reagent information includes information on the temperature dependence of the index of refraction of an optical component to be used for fluorescence analysis; and in the step of analyzing the sample, the arrangement of the optical system is adjusted on the basis of the measured value of environmental temperature sensor 10.

With this configuration, the reaction temperature in the sample analysis step can be precisely controlled on the basis of the information on the type of the reagent or the temperature dependence of the index of refraction of the optical system used for fluorescence analysis and on the basis of information on environmental temperature sensor 10. In addition, the optical system can be quickly adjusted during the fluorescence analysis, making it possible to perform quick analysis as well as improving temperature control stability in the sample analysis step and reducing the analysis error.

The following describes features of this embodiment with reference to FIG. 7 and FIG. 8.

In particular, when the present invention is applied to an analysis apparatus that includes an SPFS device and that uses an immune reaction and fluorescence analysis, the reagent information desirably includes information on the temperature dependence of the index of refraction of the optical component.

The step of analyzing the sample includes the detection step (S15) illustrated in FIG. 8. In the detection step (S15), stage 4 in FIG. 7 is moved to the measurement position, the light projection optical system is adjusted, fluorescence is excited, and the amount of excited fluorescence is detected by the light detection means via the light receiving optical system, thereby achieving the detection of a minute amount of substance to be measured.

In analysis apparatus 1C that uses surface plasmon enhancement, the degree of enhancement changes depending on the incident angle, and thus the incident angle needs to be precisely controlled. It is known that the incident angle is dependent on the index of refraction of the sensor chip illustrated in FIG. 7 (the sensor chip is constituted by an optical prism and a thin metal film for plasmon enhancement) and that the index of refraction has a temperature dependence.

Therefore, as in this embodiment, the reagent information includes temperature dependence information of the index of refraction of an optical component used for fluorescence analysis, and the arrangement of the optical system is adjusted on the basis of the measured value of environmental temperature sensor 10 in the step of analyzing the sample. Accordingly, the electric field enhancement intensity of the plasmon enhancement field can be kept constant regardless of the temperature, and the signal stability with respect to the temperature of the measurement system can be improved.

<9> Other Embodiments

The embodiments described above are merely examples of specific implementation of the present invention, and the technical scope of the present invention should not be restrictively interpreted by these embodiments. That is, the present invention may be implemented in various forms without departing from the spirit thereof or the major features thereof.

<9-1> For example, in the configurations of the first and second embodiments described above, the temperature control target value of pipette tip temperature adjustment section 7 may be reset to the initial value after the sample analysis is completed, and pipette tip temperature adjustment section 7 may be configured to continuously perform the temperature adjustment even after the sample analysis is completed. With this configuration, the apparatus internal temperature can be kept constant while no analysis is being performed, and the stability of the apparatus internal temperature can be improved.

<9-2> For example, in the configurations of the first to third embodiments described above, in the reaction step during analysis, the control target temperature of pipette tip temperature adjustment section 7 or reaction container temperature adjustment section 8 may be switched in accordance with the type of analytical reagent. With this configuration, the control target value is changed in advance in the step during the reaction, thereby achieving stable control of the temperature in each reaction step.

The disclosure of Japanese Patent Application No. 2018-073390 filed on Apr. 5, 2018, including the specification, the drawings, and the abstract, is incorporated herein by reference in its entirety.

INDUSTRIAL APPLICABILITY

A temperature adjustment system of the present invention is applicable to an analysis apparatus that performs an analysis process on a sample such as a reagent by using a pipette tip and a reaction container.

REFERENCE SIGNS LIST 1A, 1B, 1C Analysis apparatus
2 Inspection cartridge
21 Storage tank
3 Reaction container
31 Reaction tank
4 Stage
41 Slide base
42 Linear guide section
5 Liquid feed section
51 Pipette tip
52 Pipette nozzle
53 Pump
54 Nozzle driving section
55 Pipe
6 Control section
6a Temperature control section
61 Pipette tip temperature acquisition section
62 Environmental temperature acquisition section
7 Pipette tip temperature adjustment section
71 Casing
8 Reaction container temperature adjustment section
91 Stage driving section

The invention claimed is:

1. A temperature adjustment system to be applied to an analysis apparatus that analyzes a sample by using a pipette tip and a reaction container, the temperature adjustment system comprising:

a pipette tip temperature adjustment section, comprising a casing and a heat source, that performs a temperature adjustment of the pipette tip;
an environmental temperature sensor that senses at least an environmental temperature that is inside the analysis apparatus and outside of the casing;
a pump fluidly connected to the pipette tip and configured to suck a liquid into the pipette tip and discharging the liquid from the pipette tip; and
a controller configured to set, based on temperature that is sensed by the environmental temperature sensor outside of the casing before the sample analysis, a temperature control target value of an inside of the casing of the pipette tip temperature adjustment section for use during the sample analysis,
wherein the reaction container and at least part of the pipette tip are outside of the casing.

2. The temperature adjustment system according to claim 1, further comprising:
a driving section, comprising an actuator, configured to raise and lower the pipette tip through openings of the casing of the pipette tip temperature adjustment section, wherein
the controller is further configured to set, based on analytical reagent information and the environmental temperature sensed by environmental temperature sensor, the temperature control target value of the pipette tip temperature adjustment section.

3. The temperature adjustment system according to claim 1, further comprising:
a reaction container temperature adjustment section, comprising a second heat source separate from the heat source, that controls a temperature of the reaction container, wherein
the controller is further configured to set a control target temperature of the reaction container temperature adjustment section lower than a set temperature of the pipette tip temperature adjustment section.

4. The temperature adjustment system according to claim 2, further comprising:
a reaction container, separate from the casing and the heat source; and
a reaction container temperature adjustment section that controls a temperature of the reaction container, wherein
the controller is further configured to set a control target temperature of the reaction container temperature adjustment section lower than a set temperature of the pipette tip temperature adjustment section.

5. The temperature adjustment system according to claim 1, wherein the controller is further configured to:
reset the temperature control target value of the pipette tip temperature adjustment section to an initial value based on a sample analysis being completed; and
control the pipette tip temperature adjustment section to continuously perform the temperature adjustment after the sample analysis is completed.

6. The temperature adjustment system according to claim 1, wherein the controller is further configured to:
switch a control target temperature of the pipette tip temperature adjustment section based on a type of the sample.

7. The temperature adjustment system according to claim 3, wherein the controller is further configured to:
switch the control target temperature of the reaction container temperature adjustment section based on a type of the sample.

8. The temperature adjustment system according to claim 4, wherein the controller is further configured to:
   switch the control target temperature of the reaction container temperature adjustment section based on a type of the sample.

9. The temperature adjustment system according to claim 1, wherein the controller is further configured to set the temperature control target value based on the environmental temperature sensor sensing the environmental temperature inside the analysis apparatus and an environmental temperature outside the analysis apparatus.

10. The temperature adjustment system according to claim 1,
   wherein the controller is further configured to control the heat source to heat the inside of the casing to the temperature control target value.

11. The temperature adjustment system according to claim 1,
   wherein the controller is further configured to set the temperature control target value based on both the environmental temperature and the sample.

12. The temperature adjustment system according to claim 1,
   wherein the environmental temperature sensor is outside of the casing.

* * * * *